(12) United States Patent
Morabit et al.

(10) Patent No.: US 6,862,871 B2
(45) Date of Patent: Mar. 8, 2005

(54) HYBRID MOWER, EDGER, TRIMMER, BLOWER

(76) Inventors: Vincent D. Morabit, 1230 Wendy Rd., Rock Hill, SC (US) 29732; Christopher James Morabito, 654 E. Main St., Rock Hill, SC (US) 29730

(*) Notice: Subject to any disclaimer, the term of this patent is extended or adjusted under 35 U.S.C. 154(b) by 0 days.

(21) Appl. No.: 10/135,828

(22) Filed: May 1, 2002

(65) Prior Publication Data

US 2002/0189221 A1 Dec. 19, 2002

Related U.S. Application Data

(63) Continuation-in-part of application No. 09/370,897, filed on Aug. 10, 1999, now Pat. No. 6,415,585.
(60) Provisional application No. 60/287,406, filed on May 1, 2001.

(51) Int. Cl.$^7$ .............................................. A01D 34/00
(52) U.S. Cl. ..................................................... 56/12.7
(58) Field of Search ........................... 56/12.7, 12.1, 56/17.1, 17.5, 255, 295, 237, DIG. 12, 239, DIG. 20, 16.7, 17.2, 322; 16/35 R; 30/210, 231, 233, 216, 290, 296.1

(56) References Cited

U.S. PATENT DOCUMENTS

| | | | | |
|---|---|---|---|---|
| 2,638,730 A | * | 5/1953 | Davidson | 56/400.14 |
| 4,269,372 A | | 5/1981 | Kwater | |
| 4,356,686 A | | 11/1982 | Lessig, III | |
| 4,493,151 A | | 1/1985 | Mitchell | |
| 4,531,350 A | * | 7/1985 | Huthmacher | 56/17.5 |
| 4,688,376 A | * | 8/1987 | Wolfe, Sr. | 56/16.7 |
| 4,704,849 A | * | 11/1987 | Gilbert et al. | 56/17.5 |
| 4,796,415 A | * | 1/1989 | Moore | 56/16.9 |
| 4,825,627 A | | 5/1989 | Truderung | |
| 4,827,702 A | | 5/1989 | Cerreta | |
| 4,829,755 A | * | 5/1989 | Nance | 56/17.1 |
| 4,835,950 A | | 6/1989 | Cerreta | |
| 4,922,694 A | * | 5/1990 | Emoto | 56/16.7 |
| 5,092,112 A | * | 3/1992 | Buckendorf, Jr. | 56/17.5 |
| 5,276,968 A | | 1/1994 | Collins et al. | |
| RE34,815 E | | 1/1995 | Byrne | |
| D356,583 S | * | 3/1995 | Cordova | D15/17 |
| 5,613,354 A | | 3/1997 | Foster | |
| 5,722,172 A | | 3/1998 | Walden | |
| 5,761,816 A | | 6/1998 | Morabit et al. | |
| 5,810,093 A | | 9/1998 | Howard | |
| D402,297 S | * | 12/1998 | Rappolt | D15/17 |
| 5,845,405 A | | 12/1998 | Rosdahl | |
| 5,862,595 A | | 1/1999 | Keane | |
| 5,862,598 A | | 1/1999 | Lee | |
| 5,862,655 A | | 1/1999 | Altamirano et al. | |
| 5,884,462 A | | 3/1999 | Gerber | |
| 5,890,352 A | | 4/1999 | Molina | |
| 5,894,630 A | | 4/1999 | Bitner et al. | |
| 6,050,069 A | | 4/2000 | Elensky | |
| 6,085,503 A | * | 7/2000 | Hutchinson | 56/12.7 |
| 6,094,823 A | | 8/2000 | Brown et al. | |
| 6,116,350 A | | 9/2000 | Notaras et al. | |
| 6,161,292 A | | 12/2000 | Morabit et al. | |
| 6,314,848 B2 | | 11/2001 | Morabit et al. | |

OTHER PUBLICATIONS

Printout of "Weed Walker.com" Internet site, dated 1999.

* cited by examiner

*Primary Examiner*—Arpad Fabian Kovacs
(74) *Attorney, Agent, or Firm*—Nixon & Vanderhye P.C.

(57) ABSTRACT

A carriage device for a string trimmer includes an axle frame supporting at least two wheels. A main frame includes an axle mounting section for adjustably securing the axle frame and a shaft receiving section shaped to receive the shaft of a string trimmer. The axle mounting section includes a plurality of connecting areas for selectively adjusting a height of the axle frame. Additionally, the axle frame is preferably laterally adjustable relative to the main frame. Alternative arrangements of the main frame enable the axle frame to be rotationally adjusted relative to the string trimmer. Additionally, the carriage device is particularly suited for a mulcher system and can be readily adapted to support a sizable DC battery for cordless operation of an electric string trimmer. The device enables multi-functioning of a string trimmer including mowing, edging, blowing, mulching, etc.

34 Claims, 28 Drawing Sheets

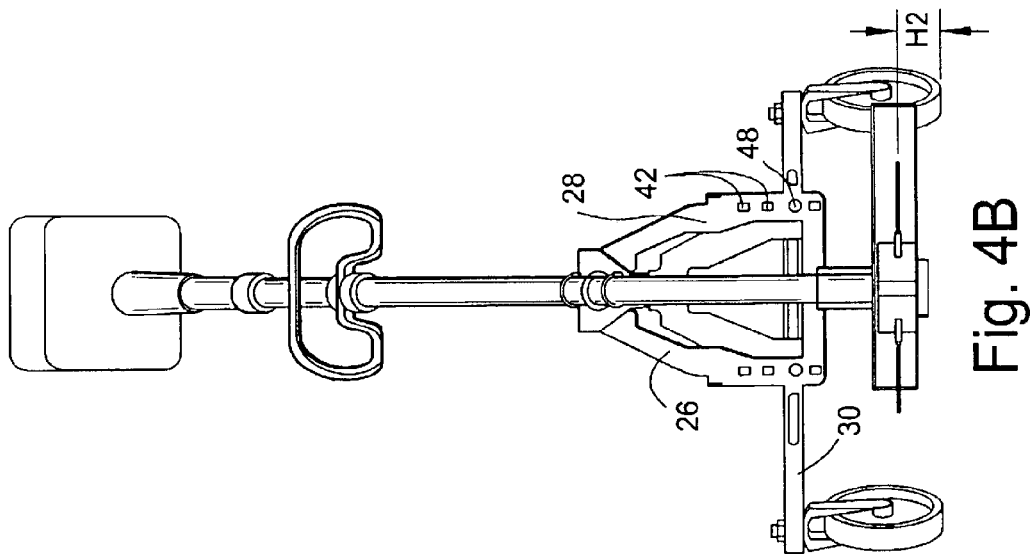
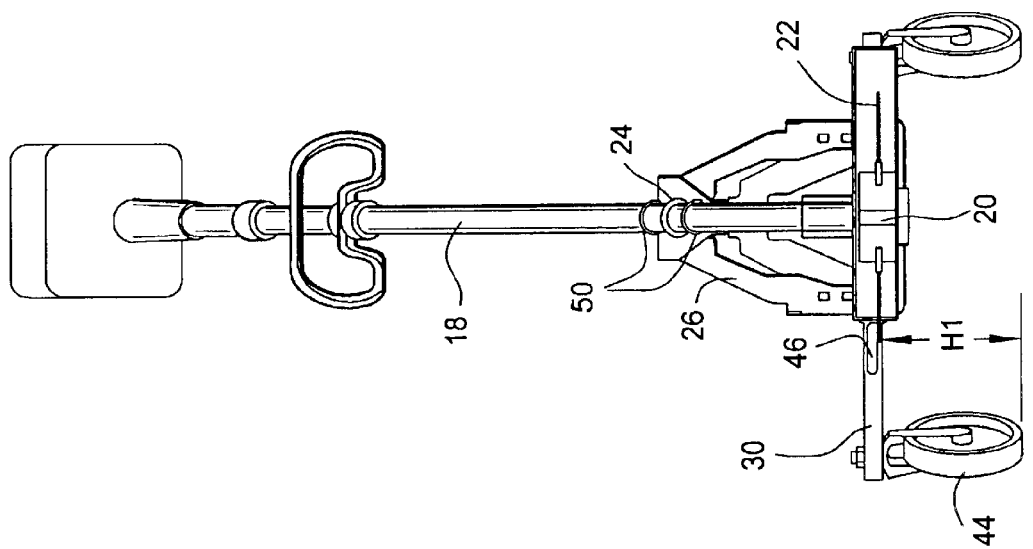

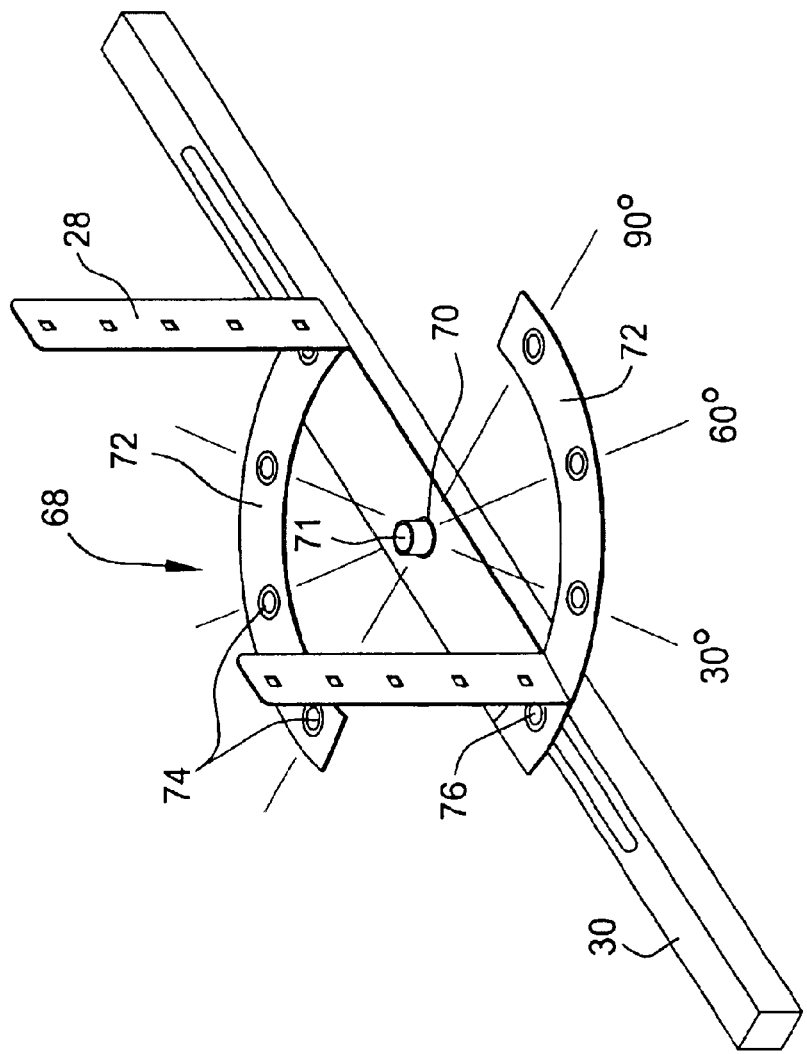

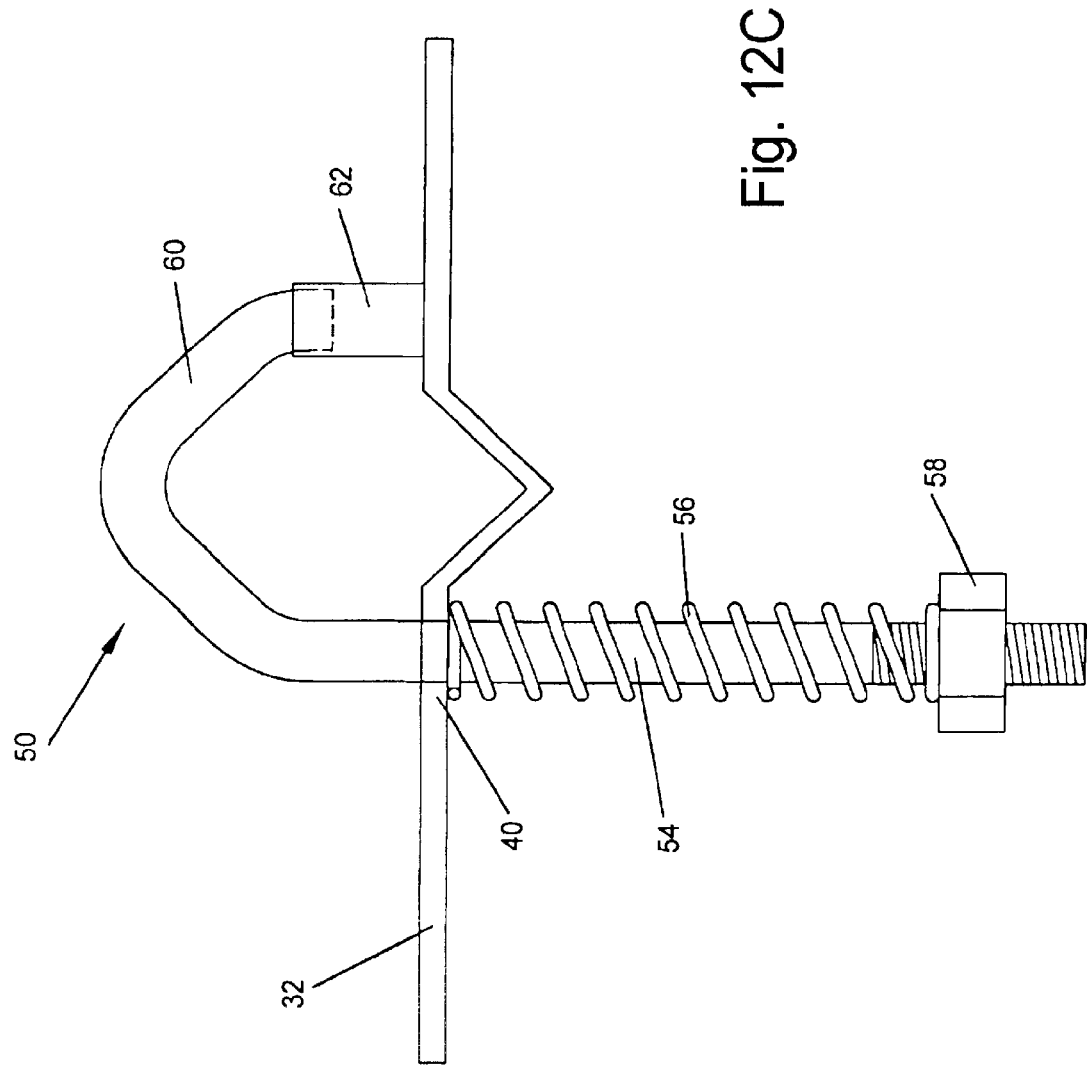

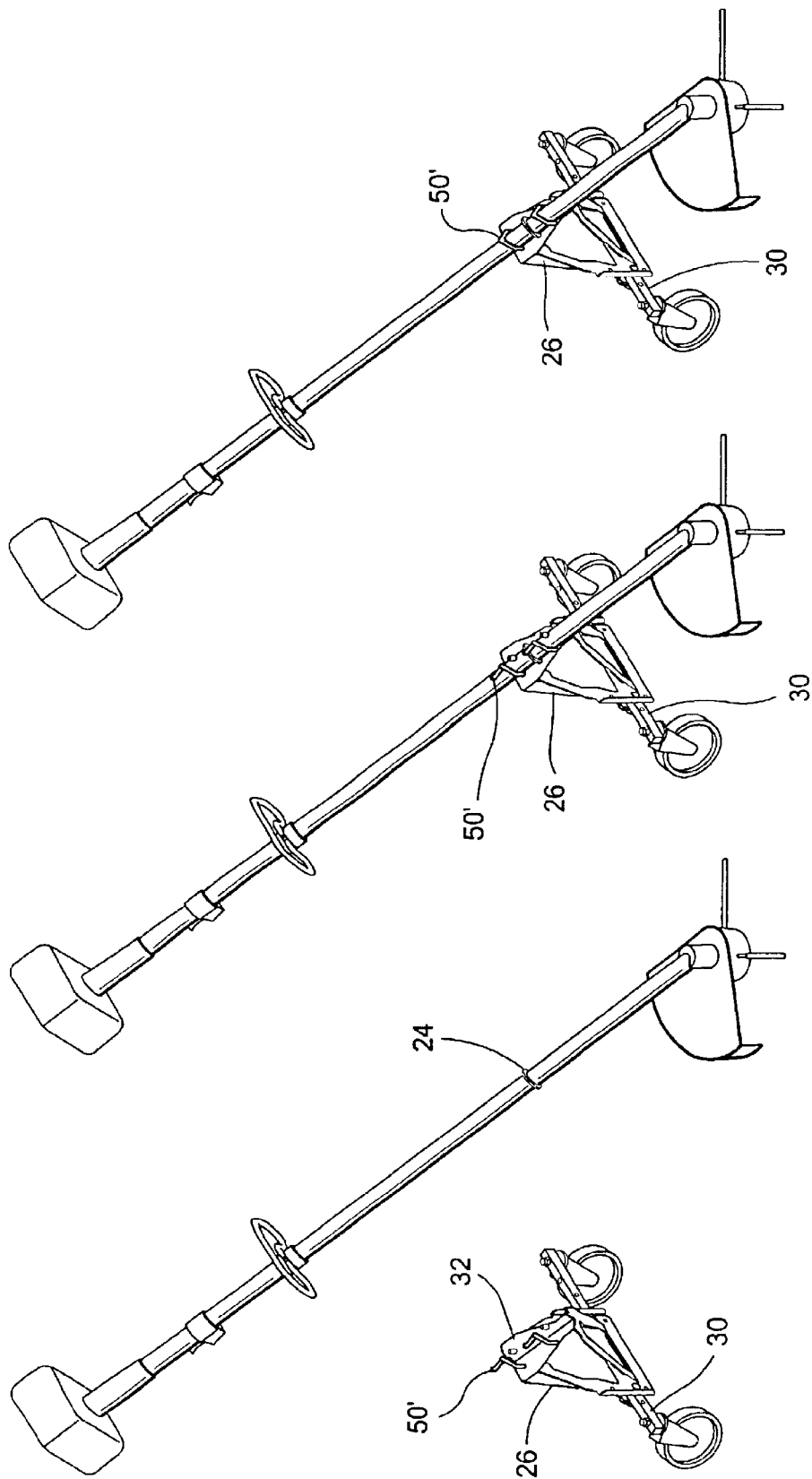

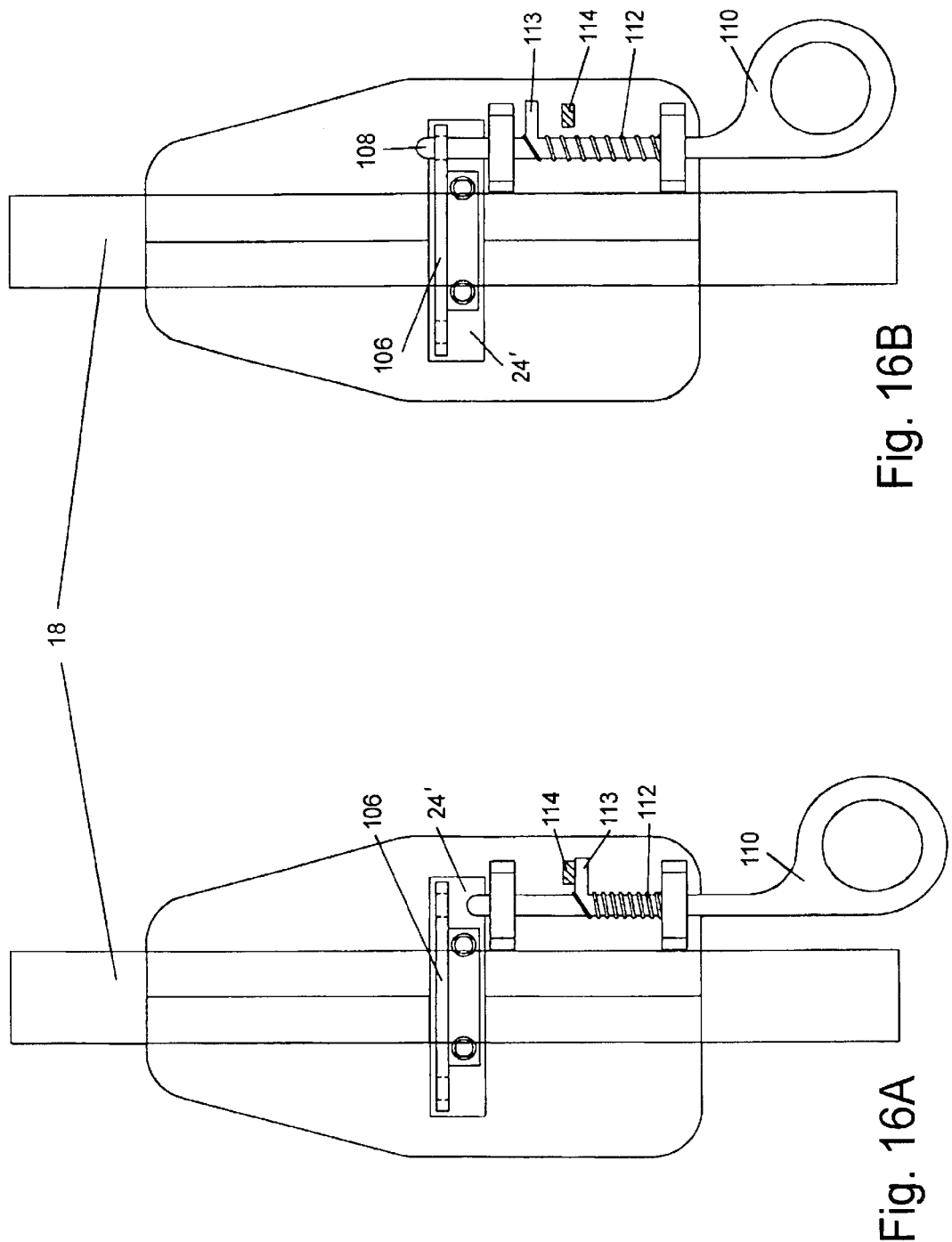

HYBRID MOWER, EDGER, TRIMMER, BLOWER

CROSS-REFERENCES TO RELATED APPLICATIONS

This application is a continuation-in-part of U.S. patent application Ser. No. 09/370,897, filed Aug. 10, 1999, and this application claims the benefit of U.S. Provisional Patent Application Ser. No. 60/287,406, filed May 1, 2001, the entire contents of which are herein incorporated by reference.

STATEMENT REGARDING FEDERALLY SPONSORED RESEARCH OR DEVELOPMENT (Not Applicable)

BACKGROUND OF THE INVENTION

The present invention relates to the field of vegetation cutting quality, disposal of cutting remains, productivity and ergonomics. While it also applies to conventional symmetrical flexible line, additional significant benefits are more particularly directed to the application of aerodynamic cutting line features in combination with the flexible line trimmer and a wheeled attachment apparatus that easily connects to the trimmer shaft. These inventions allow the evolution of a whole new series of maneuvering options and tools with universal and multi-task capabilities.

Heretofore, there have been many cutting methods and devices for the cutting, edging, mulching, blowing and sweeping, vacuuming, and disposal of the grass, weeds, leaves, and other types of vegetation involving well-manicured lawns, walkways, golf courses, cemeteries, industrial establishments, roadways, drainage areas, waterways, lake and stream edges, all of which are associated with obstacles such as embankments, generally uneven surfaces, steep slopes, trees, rocks, posts, building edges, fence lines, edges of walkways, flower and shrubbery beds, and a whole variety of other type impediments.

Such work functions are extensively applied to a wide variety of establishments such as small plot home sites, large estates, industrial and business centers, townships, parks, cemeteries, golf courses, local, state and federal highways, waterways, etc. all of which have experienced increased demands for high quality manicuring and cosmetics. This demand has evolved more extensively in the United States and is growing in the remaining areas of the world, principally due to the evolution of more productive and specialized equipment as well as the horticultural knowledge boom, all of which has been provided at a reasonable cost. Thus, there has been the creation of a value-achieved and affordable benefit. Accordingly, huge markets have developed for a wide variety of rotary mowers (riders, walk-behinds), hovering mowers (rotary mowers without wheels), edgers, blowers (hand-held and back-supported), flexible line trimmers and brush cutters, hedge trimmers, cultivators, and other specialty tools such as thatchers, aerators, shredders, leaf mulchers, vacuums, etc. to perform such a wide variety of different and necessary operations to achieve all these advancing cosmetic and demanded high quality standards. Each tool provides generally specific and functional specialty segments of an overall process. Such tools also require unique skills to operate, know how, specialty repair and maintenance tools, storage space, transporting such tools to the work location as well as the need to switch from one tool to another.

Development progress within each specialty tool has been impressive as existing tool design has been refined, however, these tools have not been without problems in one way or another in that they are laborious and time consuming to use, have their own safety concerns, are complex and heavy, are difficult to maneuver and transport, require substantial space to store, and are largely inefficient and noisy both within the environment and to the operator. This is largely due to the multitude of specific work requirements within the extensive and total process of vegetation cutting and maintenance as tools have become very specialized and accordingly designed to perform specialized and seasonal tasks. Examples of such tasks are mowing grass; edging or cutting cleanly along walkways and flowerbeds; trimming into steep terrains, up to trees, and edging along buildings, walkways, and fences; using brush cutter metal blades to cut heavy vines and weeds; blowing or sweeping cuttings and debris off walkways; collecting grass clippings and debris; mulching and collection of fallen leaves; and residual or interactive steps required to interchange tools, transporting them, maintaining them, and finally storing them for future use.

The more popular rotary blade, wheel supported mowing process utilizes a protected rigid steel blade that runs at uniform and low tip speeds of 15000–18000 feet per minute while requiring strong protective decks and discharge chutes, one-way wheel travel, and protected operator work zones, i.e. at the rear of a walk-behind or seated on a riding mower. Since injuries involving the clearing of grass clogging from a discharge chute are a major concern, complex blade stopping systems are required but are a nuisance or are frequently bypassed by users. Further, such mowers are not able to safely cut beyond obstacles, steep slopes, swails, or confined locations. Some of the more expensive mowers incorporate a zero turning radius but cannot move sideways. Specialty hovering mowers move in all lateral directions and do not use wheels but require added power to create an air cushion, and must utilize flexible cutting line to prevent operator foot injuries from side to side motions.

The rotary mower cutting process also requires added power to pump airflow so as to lift grass for clean cutting and then to accelerate cuttings through special discharge chutes and extensions designed and placed accordingly to reduce clogging and thrown objects. Adding these necessary features and components sacrifices versatility and maneuverability. Further, these mowers cannot cut along or up to obstacles due to the interference from their required blade protecting deck and related discharge chute extensions.

To assist in other processes where rotary mowers cannot safely function, the operator hand-held flexible line trimmer, a relatively recent product of the 70's, has become a very important and welcomed tool to trim, edge and cut grass over and around and into tight places. This versatile tool allows the operator to move the trimmer head to any location or position and to trim horizontally, vertically, or at head angles in between. The trimmer filled a much-needed void but also is not without its own inherent problems. The flexible fishing line utilized for the grass trimmer which is made from an extrusion process into various symmetrical shapes (round, square, star, triangular, etc.), is overstressed, easily breaks, and requires complex replacement mechanisms to replenish the cutting length and/or with more frequent use of manual replacement systems. This conventional line requires high speed to reach an effective centrifugal stiffness while it creates a high pitch noise. Attempts to use heavier and larger diameter line sizes add to the already high and wasted power required to overcome air drag as well as higher noise. Further, speed drops with the thicker line sizes, clutches burn out, and cutting quality diminishes further from conventional cutting lines that normally produce a mashing type cut. The blunt surface of the line does not cut or sever grass but mashes it while pushing it downward and away from the cutting plane. As a result, grass browning (mashed grass dries out-browns at the tip)

results while unevenness of cutting height remains a major problem and accordingly a reduction in manicuring quality.

Many unsuccessful attempts were historically ventured with wheeled apparatus to convert the flexible line trimmer to a mower. High wheel trimmers with only a fixed horizontal plane of cut, have limited versatility with many disadvantages similar and representative of the rotary mower. Conventional high wheel trimmers do not allow the head to tilt for edging and other trimming positions, and like hand-held grass trimmers suffer from overstressed or weak line breakage and replenishment problems which dramatically increase user frustrations. Additionally, flexible line trimmers require high tip speeds (25000–32000 feet per minute), because they rely on centrifugal force applied to a relatively low mass to create a transfer strength of torque and power into the cutting process (centrifugal stiffness). When the fast moving line hits an obstacle like a fence or small piece of brush, the line continues to move and wraps around the obstacle, self-locking it only to ultimately break off. Additionally, the small cross-sectional area of the line wears rapidly on abrasive surfaces, further creating repeated loss of its cutting length. Additionally, these lines split on the ends known as fibulation due to high impact. At lower speeds and into more resistant vegetation, the flexible symmetrical line easily folds and/or slides off the material it intends to cut, thus creating great limitations in cutting more sizeable vegetation. Accordingly, flail systems (plastic blades on hinge pin), which often shatter and break, and metal blades are necessary to cut heavy weeds, vines or thick/strong vegetation. The flex line trimmer then converts to a metal blade tool known as a "brush cutter". Similarly, a specialized vertical metal blade tool ("stick blade edger") is often chosen to cut grass and sod evenly and close to walkways because the flexible line is too weak and very difficult to control under such operations.

Additionally, longer use of a handheld flexible line trimmer is laborious and becomes tiring and fatiguing. The process also creates gouging or scalping into grass along walkways and sloping contours as the operator attempts to mow evenly with the trimmer into these areas. The strenuous process is further compounded because the trimmer's weight is extended or cantilevered from the operator's body when added reach is further needed. This leads to physical back strain especially to elderly people or to those with preexisting back ailments. A harness strap is infrequently used to more evenly suspend the weight down through operator's torso but also creates restriction to more needed operator reach and need for head tilt control for specialized trimming and cutting. It is also very difficult to hold and control the invisible cutting plane of conventional line to a level position when walking or moving with the trimmer, thus creating poor quality, and unsightly gouging, and scalping.

The removal of unwanted clippings and debris is another important part of the overall process that requires the use of higher energy consuming, and generally noisy handheld or backpack blowers. Again, the operator must transport and interchange to another tool, a centrifugal blower, which uses an inherently noisy compression and expansion cycle to produce high velocity air directed through an output nozzle to blow away clippings and debris from prior processes. Community environmental noise and dust has been of great concern creating local ordinances and forbidden use of such products in some areas of the United States.

Additionally, the greater proportion of these uniquely different and selective handheld tools are powered by two cycle engines and subject to severe emission regulations. Lower emission alternatives, such as the heavier and less powerful four cycle engines or two cycle engine catalytic converters will only add weight and present more complexities when powering these commonly used rotary mowers, flexible line trimmers, brush cutters, edgers, and blowers. Electric motors which offer environmental benefits, AC or cordless DC, are currently limited due to cumbersome cords or the burdens added by battery weight with shortened operating power capacity and duration.

BRIEF SUMMARY OF THE INVENTION

The above specialized processes and inherent problems currently being experienced with each respective process tool to cut and mulch grass, weeds and other vegetation, to blow and sweep and to collect clippings and debris created, establishes a great need for improvements in designs, methods, techniques, as well as utilization of combined technologies. This invention teaches a new approach in solving the numerous problems cited above. It provides a means to achieve the benefits of a simple structural frame and with optional wheel systems that expands and enhances a flexible line trimmer from a presently limited and frustrating tool to use to a mobile, wheeled supported, versatile, adjustable, fully maneuverable, highly ergonomic universal and multi-task vegetation cutting and management tool with its own unique attachment features and optional benefits.

This wheeled invention greatly improves a rotary mower process by creating the necessary updraft with a sufficiently high-speed flexible line blade, without a deck and including swivel wheels with the ability to maneuver to all lateral and forward directions, up to and around obstacles, objects and impediments, etc., thus eliminating the need for the operator to change to, transport and use another processing tool. It allows the operator to mow and trim with quality and level cutting height in one pass. Its swivel wheels free the side-to-side restrictions of the walk-behind rotary mower and the open line blades eliminate its cumbersome deck interference. It performs cutting and mowing (rotary definition) with a flexible line blade thus offering an enormous relief from the dangerous solid blade contact while also eliminating dangerous clogging within the discharge chute because it does not need a chute. This apparatus can now safely mow and trim within tight areas, to steep slopes, and rugged terrain with much greater efficiency in maneuverability, control and quality.

This invention greatly extends the operator's reach with the trimmer with greater ease and reduced back strain. It utilizes the basic line trimmer as a fundamental tool along with component attachments to allow a single yet highly universal multi-process, all-in-one combination, that eliminates bulky tool selection and transportation, as well as valuable storage space required for other traditional process tools. However, if desired by users or marketers, individual specialized tools can be manufactured and sold with a family of attachments to a basic power head to include a mower-trimmer set, an edger-blower set, a leaf shedder vacuum system, a garden vacuum system, as examples.

This invention can be expanded to a wide range of power sourcing to match unit sizes from small to large such as a small battery powered unit while extending up to large roadside mowers. For example, the wheeled frame can easily support a fairly large 12-volt battery system or engine system placed over the wheel base to reduce weight suspended at or toward the operator's end, while creating a better balance suspended over the axle. The concept can also be expanded to large tractor-pulled attachments for roadside and guardrail mowing and trimming.

The invention can be quickly attached or removed from a conventional trimmer without modification or change to the trimmer's guards, throttle controls etc. It will fit most existing shaft diameters with its "V" groove base structure embodiment.

While it will vastly improve a trimmer with conventional symmetrical cutting line, its greater benefits will be realized with the numerous features offered within the technology of aerodynamic cutting line blades as discussed in U.S. Pat. No. 6,314,848, particularly with the ability to pitch or angle the line blades for updraft or downdraft for the mowing and blowing processes respectively. Additionally, the line blades can easily be manufactured with a blunt or sharp edge leading into the cut, thus allowing the trimmer designer to choose between energy drag reduction, cutting quality, durability or any combination thereof as fundamental design objectives. Additionally, much broader manufacturing options result from this technology with ability to produce various quality cutting line grades from commercial to homeowner categories by utilizing either the low draw extrusion process or conventional injection molding with or without low draw. This achieves added durability benefits offered from the broad technology because of the key low stress design capability incorporated into the aerodynamic line blade system and in combination with a "bi-lateral" molecular chain within the flexible co-polymer materials employed which eliminates fibulation, often experienced with conventionally extruded and drawn lines. Further, benefits of the aerodynamic flexible line blade provide up to 50 times the durability (based on comparative testing compared to conventional line) while also providing simple loading, all of which when combining other significant utility and safety benefits such that in total, offers a reasonable substitute for the rigid metal rotary mower cutting blades and their related and restrictional design requirements.

The invention incorporates the ability to make critical adjustments such as head tilt, trimmer elevation levels for tall or short people, and for right or left hand operators. Additionally, level cutting height is easily and accurately positioned and maintained with a simple control collar loosening to slide the shaft and head to a precise cutting elevation. The head can tilt from a horizontal plane to any position including a complete 180° turn for special edging operations. Further, the wheel axle slides from side-to-side to position both wheels to the side or to straddle the intended cutting line. The wheel axles can interchange from swivel wheels to fixed or indexed high wheels using the same frame.

Additionally, a number of ways are provided to allow quick convertibility from a wheel supported trimmer back to a handheld brush cutter and trimmer as desired by the operator. Ordinary metal clamps can be used as well as adjustable spring loaded clamps that are pulled upward and rotated to release the trimmer from the frame. Such use with a metal blade may require the trimmer's removal from the frame along with use of a supporting and restrictive harness.

The technology offers a number of ways to achieve level or consistently even cuts with this apparatus ranging from four-wheel height control, to three-wheel, to two-wheel with a manually controlled head position or with an elevation height control attached directly under the rotating head. Also, the head can be locked into a fixed position either for a level or bevel cut. A universal joint mechanism further allows mowing upward along a rapidly rising slope or downward along a dropping slope while holding the trimmer's trigger mechanism into a consistency reachable and generally waste-high position.

It is a further objective and capability of this technology to mow and trim along any edge or rim while its wheel base length exceeds the cutting swath diameter. The extended wheel base is helpful to prevent and resist the frame from tipping over and to allow added wheel stability when tilting the head.

For special circumstances, to reduce grass splash back to the operator, a transparent splash shield can be added to the frame or to the guard of the trimmer to intercept thrown materials where the line blades are directed toward the operator. This may vary depending on the physical rotational characteristics of the trimmer, as some trimmer heads turn clockwise while others turn counterclockwise.

The process of using this wheel-supported trimmer in combination with updraft lines is very fuel efficient, at least 50% better than conventional trimmers, because the line blades are of low aerodynamic drag while the necessary cutting centrifugal stiffness can be achieved at about half the speed. Essentially, there are two tier benefits toward energy reduction, which further reduces environmental emissions and such high-energy dependency. High pitch line noise which is generally proportionate to its power reduction is dramatically reduced. The operator simply runs at part throttle while having power to spare for heavier vegetation cutting. Fuel conserving governors can be added to maintain a maximum speed level. The efficiency of this invention can lead to smaller lighter weight power sources such as cordless DC motors and related systems. The invention will also be more compatible than conventional line such as with the lower speed, small four-cycle engine technology because the line blades can deliver higher torque at lower speeds, thus contributing to the reduction of environmental emissions. Further, the wheeled frame system provides a means for better control of the placement of line tip when addressing vegetation to be cut because the tip does the cutting and any reduction of other unproductive line contact is power saved. Further, because of the line greater overall mass, the system kinetic energy is greater and combined with its smaller cutting edge produces a much higher kinetic energy density (ft. lbs./cutting area) in the order of 7–10 times greater compared to a conventional line system of the same vertical exposure. Therefore, the flexible line blade system is a substantially better cutting mechanism into vegetation incapable of being cut with conventional line and which would normally require metal blades. As an example, this system (preferably about 15.5" swath diameter) can easily power through honeysuckle vines, blackberries, heavy weeds, light brush (less than ¼" diameter) powered with a small 25 cc two-cycle engine while conventional line would slide off and not cut at all. The heavy 4–6 horsepower conventional rotary mower and its associated deck interference is highly inefficient and unproductive compared to the invention mechanism which maneuvers with little resistance in all directions because it eliminates the restrictions of the conventional line trimmer/brush cutter and the walk-behind solid bladed rotary mower. Its compact size, simplicity and durability, lightweight, ease of control, fuel efficiency, quietness and smoothness, from its superior low vibration cutting ability, versatility etc. collectively create a highly desirable and universal tool that is in great need to more easily achieve the multiple tasks and processes currently performed (rather inefficiently) by collectively numerous state of the art specialty tools.

The technology also provides a very impressive means to edge and blow clippings away with a simple and easy line blade change from updraft lines to specially pitched downdraft lines. The more efficient air movement from the line blade process paddles a wide envelope and high volume of air without the energy consuming compression of air and the need to centrifugally generate high air pressure for nozzle delivery discharge and expansion. This process is more efficient, much quieter and more environmentally friendly for community noise reduction efforts.

Further, the technology incorporates the use of updraft line blades to lift leaves, mulch them within inches of where they rest on the ground, and then the updraft airflow transports the mulched and shredded remains into an external bagger or into a "tub" type collection system. Testing results using a 25 cc two-cycle engine show that elevated and lifted leaves are mulched to less than 10% of their original volume by the powerful flexible line blades and can rapidly fill a two-bushel volume with ease. This system also serves as a garden vacuum system to lift clippings and yard debris and collect them efficiently.

In total, this technology teaches the extended use of the grass trimmer into a multi-purpose, versatile tool with numerous vegetation processing capabilities by combining a series of new art with flexible cutting lines as well as with the developing aerodynamic flexible cutting line blade technology. This tool now becomes a universal multi-purpose tool broadly reaching across and simplifying the various processes of cutting grass, mowing, trimming, edging, blowing, in addition to leaf and yard debris mulching, and vacuum collection system attachments.

In an exemplary embodiment of the invention, a carriage device for a string trimmer includes an axle frame supporting at least two wheels, and a main frame including an axle mounting section for adjustably securing the axle frame and a shaft receiving section shaped to receive a string trimmer shaft. The axle mounting section includes a plurality of connecting areas for selectively adjusting a height of the axle frame. Preferably, the axle frame is laterally adjustable relative to the main frame. Moreover, the axle frame may support a first wheel type, wherein the axle frame is interchangeable with an alternative axle frame supporting a second wheel type The axle mounting section may include a plurality of holes aligned in at least one vertical column relative to ground, wherein the axle frame has an internal slot for each vertical column of holes, each internal slot receiving an axle connector when aligned with a respective hole. In one embodiment, the axle frame includes at least two swivel wheels secured via respective wheel connectors, the swivel wheels being mounted to swivel about a substantially vertical axis relative to ground. In this context, wherein the axle frame may include a plurality of wheel mounting holes across the axle frame for each of the wheels, wherein the wheels are selectively securable in any of the wheel mounting holes. In another embodiment, the axle frame may be bent at ends thereof into at least two L-shaped brackets, wherein the wheels are rotatably secured to the L-shaped brackets.

The shaft receiving section may be provided with a V-shaped groove for receiving the string trimmer shaft.

The shaft receiving section may include a control collar slot that is shaped to receive a control collar fixed to the string trimmer shaft and at least one trimmer clamp slot that receives a trimmer clamp for securing the string trimmer shaft to the main frame. Two trimmer clamp slots may be disposed on opposite sides of the control collar slot, with the trimmer clamp slots receiving a corresponding two trimmer clamps for securing the string trimmer shaft to the main frame. In one arrangement, the trimmer clamp is a pipe clamp. Alternatively, each trimmer clamp slot may comprise two openings in the shaft receiving section, wherein the trimmer clamp is a spring-loaded J-clamp including a threaded connector shaft extendable through one of the openings and receiving a spring and a securing nut on an end thereof for holding and compressing the spring, and an engagement hook shaped to extend over the string trimmer shaft and insertable into the other of the openings. In this context, the engagement hook may be V-shaped.

The main frame may be substantially triangular-shaped with the axle mounting section, the shaft receiving section, and a supporting bracket, wherein the axle mounting section and the supporting bracket are joined at an apex of the triangular shape, and wherein the shaft receiving section is connected between the axle mounting section and the supporting bracket. An angle between the axle mounting section and the supporting bracket is set to a shaft angle of the string trimmer. In another arrangement, the main frame can be alternatively shaped, and the main frame is configured such that the shaft receiving section is disposed at an angle matching a shaft angle of the string trimmer.

The axle mounting section may comprise a Z-frame disposed in a plane substantially parallel to ground, the Z-frame including a central aperture for receiving a first axle connector that secures the axle frame, and at least one arm member formed in an arc and including indexed apertures along the arc for selectively receiving a second axle connector that secures the axle frame such that the axle frame is rotatably adjustable relative to the main frame.

The main frame may also be provided with a battery clamp adjustably sized to support a battery for the string trimmer.

In another exemplary embodiment of the invention, a vegetation cutter includes a string trimmer having a string trimmer shaft, and the carriage device of the present invention, the shaft receiving section adjustably securing the string trimmer shaft. In this context, the shaft receiving section preferably secures the string trimmer shaft for longitudinal adjustment and rotational adjustment. The string trimmer may comprise a trimmer head with updraft line blades, wherein the vegetation cutter further includes a mulcher tub disposed surrounding the trimmer head and updraft line blades. In this context, the mulcher tub includes a mounting slot on a front side that is shaped to fit over the string trimmer shaft and a wheel assembly including a wheel on a back side. The mounting slot is sized such that the mulcher tub is substantially level when mounted on the string trimmer shaft with the wheel of the wheel assembly contacting the ground. The mulcher tub preferably comprises an outer tub including a tub lid and an open base, and an inner collecting tub disposed within the outer tub and radially spaced from an inside wall of the outer tub defining a channel therebetween. The tub lid includes a contoured portion for directing mulched material from the channel into the inner collecting tub and a screened discharge port for discharging air from the channel.

The string trimmer shaft may include a universal joint. In addition, the vegetation cutter may further include a control collar secured to the string trimmer shaft that is engageable with a slot in the shaft receiving section of the main frame. In this context, the control collar comprises a two-piece unit surrounding the string trimmer shaft, wherein each of the control collar pieces is V-shaped. The control collar may include an indexed disc including a plurality of circumferentially spaced apertures; and a spring pin having a shaft and being selectively engageable with the apertures to lock the string trimmer into a specific tilt angle, with the spring pin being biased into engagement with the apertures via a spring mounted on the shaft.

The string trimmer may comprise a rotatable head supporting a plurality of flexible line blades, wherein the line blades are selectively configurable in alternative configurations to generate an updraft or a downdraft during operation. In this context, when the flexible line blades are configured to generate a downdraft during operation, the vegetation cutter functions as an open line paddle type blower. The flexible line blades preferably comprise an aerodynamically shaped cross-section including a sharp edge and a blunt edge, wherein the line blades are selectively configurable in alternative configurations with the blunt edge leading or with the sharp edge leading.

The string trimmer may include a plurality of line blades defining a cutting swath having a cutting swath diameter, wherein the axle frame supports two wheels having a wheel base, a length of the wheel base being greater than or equal to the cutting swath diameter. In this context, the axle frame may be laterally adjustable relative to the main frame such that the cutting swath is extendable outside of the wheel base.

In yet another exemplary embodiment of the invention a kit comprises components for constructing the carriage device of the present invention.

In still another exemplary embodiment of the invention, a method of constructing a vegetation cutter including a string trimmer mounted on a carriage device is provided. In the method, at least two wheels are affixed to an axle frame, and an axle mounting section of a main frame is provided. The axle mounting section is provided with a plurality of connecting areas for selectively adjusting a height of the axle frame, and the axle frame is adjustably secured to the axle mounting section. Finally, the string trimmer is adjustably secured to a shaft receiving section of the main frame.

BRIEF DESCRIPTION OF THE DRAWINGS

These and other aspects and advantages of the present invention will be described in detail with reference to the accompanying drawings, in which:

FIGS. 4A–4D illustrate cutting height adjustment by sliding the string trimmer shaft within a control collar;

FIGS. 11A–11F show an embodiment of the invention using a "Z" bracket;

FIGS. 12A–12H show an embodiment of the invention using a quick trimmer disconnect mechanism;

FIGS. 16A and 16B illustrate a modified control collar with a spring pin; and

DETAILED DESCRIPTION OF PREFERRED EMBODIMENTS

Figure 1:
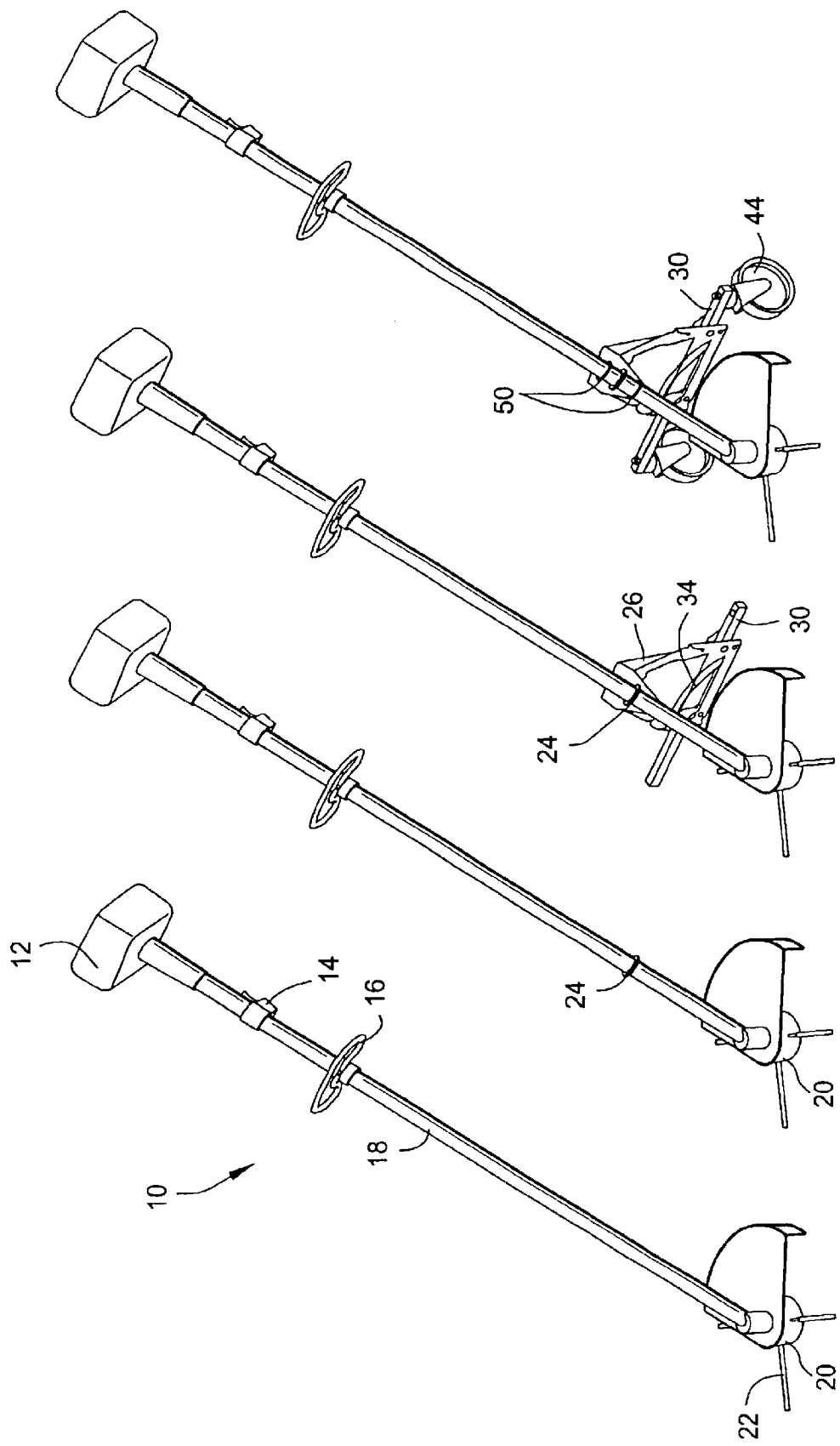
FIGS. 1A–1D show a progression from a conventional handheld trimmer to a fully assembled system.

With reference to FIGS. 1A–1D, the device according to the present invention provides a carriage for facilitating vegetation processing using a conventional string trimmer. The string trimmer 10 generally includes a power unit 12 having a throttle open and closed via operation of a trigger 14. A handle 16 is positioned along a trimmer shaft 18 to facilitate operator control. The power unit 12 imparts rotation to a cutting head that may be fitted with conventional string via conventional means such as a string spool or an aerodynamic cutting line 22 such as that described in U.S. Pat. No. 6,314,848 and available from Aero-Flex Technologies, Inc. in Rock Hill, S.C. The contents of the noted U.S. patent are hereby incorporated by reference.

A split control collar 24 is clamped to the trimmer shaft 18 at a specific distance upward from the head 20. The collar 24 may be any suitable structure for its purpose, and preferably includes a split construction to facilitate installation or a slide on single split collar. For example, the collar may comprise two U-shaped halves connectable by screws or the like. Alternatively, the collar may comprise V-shaped halves to accommodate a wide range of circular trimmer shafts. The collar 24 facilitates controlling cutting height and head tilt angle changes by a position of the trimmer 10. That is, the collar 24 locates and locks a chosen cutting height yet allows free or locked head position. The opening in the split collar 24 may also be square to fit a greater variety of shaft sizes without creating collar binding, so height adjustment can be more easily made.

Figure 8A:
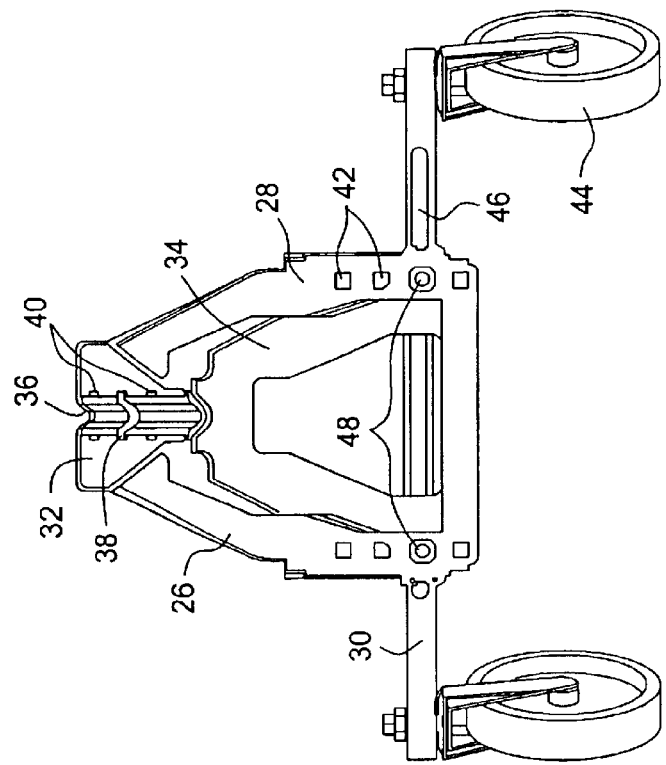
FIGS. 8A–8B illustrate axle positioning of the axle frame relative to the main frame.
Figure 8B:
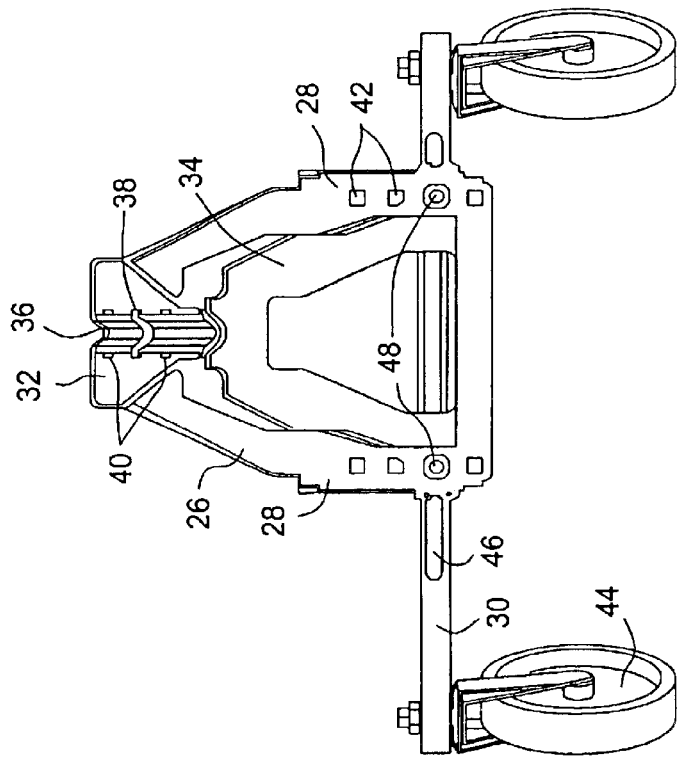

As shown in FIGS. 8A and 8B, a main frame 26 includes an axle mounting section 28 for adjustably securing an axle frame 30, and a shaft receiving section 32 shaped to receive the string trimmer shaft 18. A supporting bracket 34 extends at an angle from an area of the axle mounting section 28, and the axle mounting section 32 together with the axle mounting section 28 and supporting bracket 34 define a substantially triangular-shaped configuration. Of course, other shape configurations may be suitable, and the invention is not necessarily meant to be limited to a triangular configuration. The shaft receiving section 32 may be welded or bolted to the main frame 26 or made as an integral piece of the frame 26.

The shaft receiving section 32 includes a generally V-shaped groove 36 along the central portion thereof that is sized for receiving the string trimmer shaft 18. The shaft receiving section 32 additionally includes a control collar slot 38 that is surrounded by a pair of trimmer clamp slots or openings 40. The V-shaped groove 36 is configured to accept different sized diameter trimmer shafts 18 without causing lock-up. The "V" provides two contact points on the shaft without creating a clamping or binding force. As a consequence, the trimmer shaft, while held into a fixed axial position, is free to rotate within the "V" groove. Additionally, the V-shaped groove 36 adds rigidity to the shaft receiving section 32.

The axle mounting section 28 contains a plurality of holes 42, preferably square, that are aligned in at least one vertical column relative to ground. The axle frame 30, which supports wheels 44 of the carriage includes one or more internal slots 46 for receiving connectors 48 in the holes 42 to secure the axle frame 30 to the axle mounting section 28. The various holes 42 in the axle mounting section 28 enable the user to adjust a height of the frame 26 relative to the axle frame 30. The one or more slots 46 enable the axle frame 30 to be adjusted left or right as shown in FIGS. 8A and 8B. The height adjustment is shown in FIGS. 9A and 9B.

Figure 3:
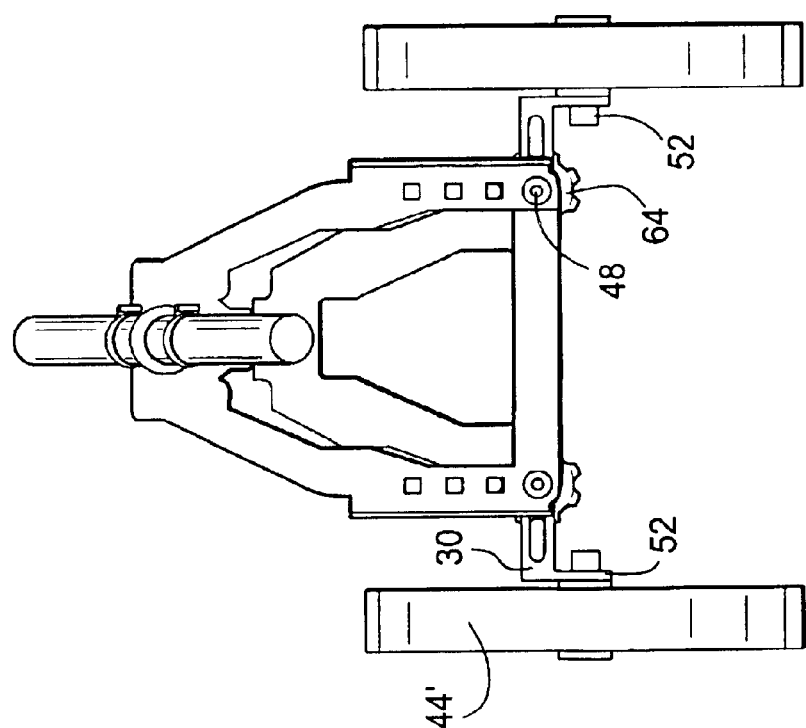
Figures 4C, 4D:
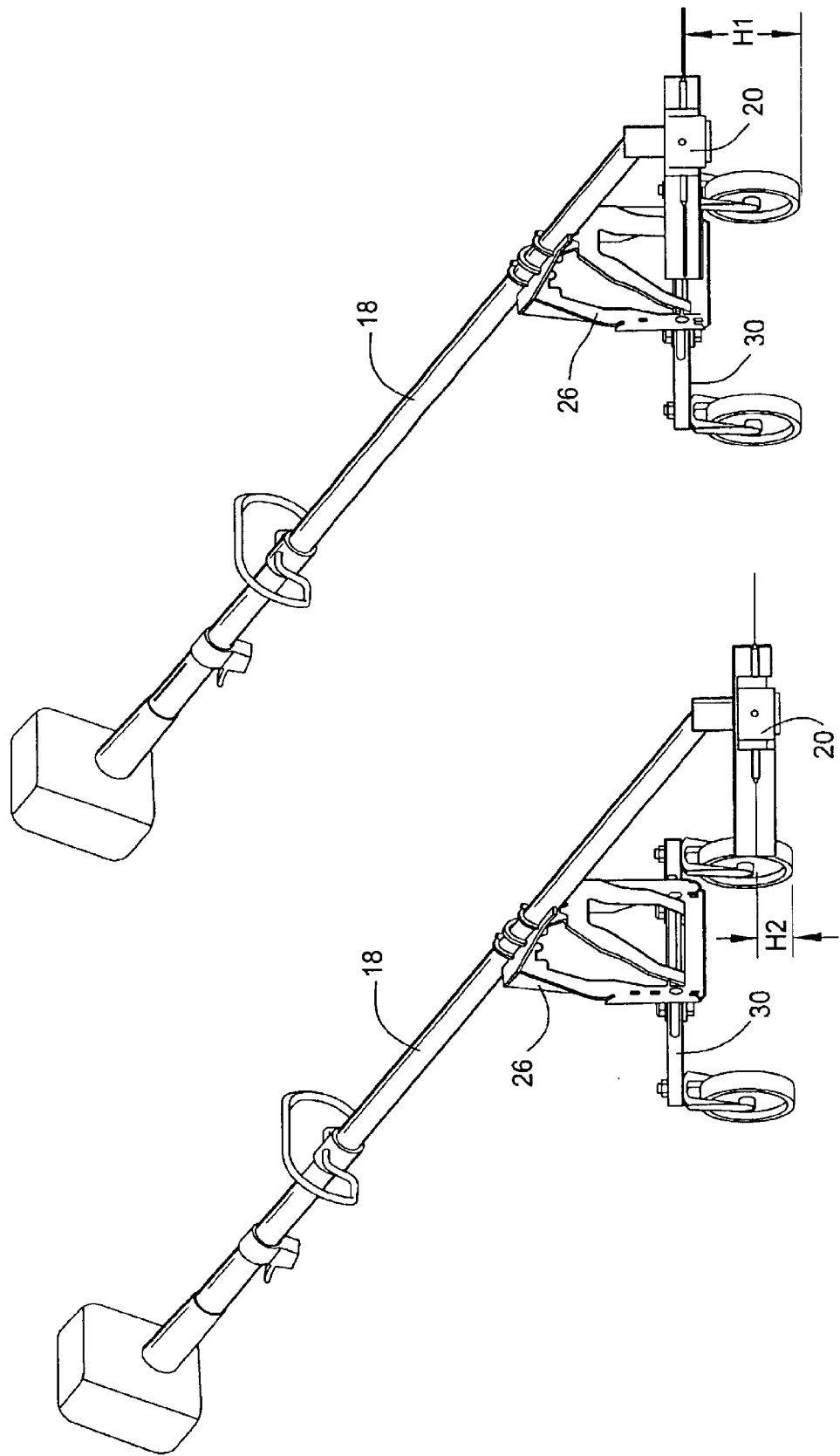
Figure 9B:
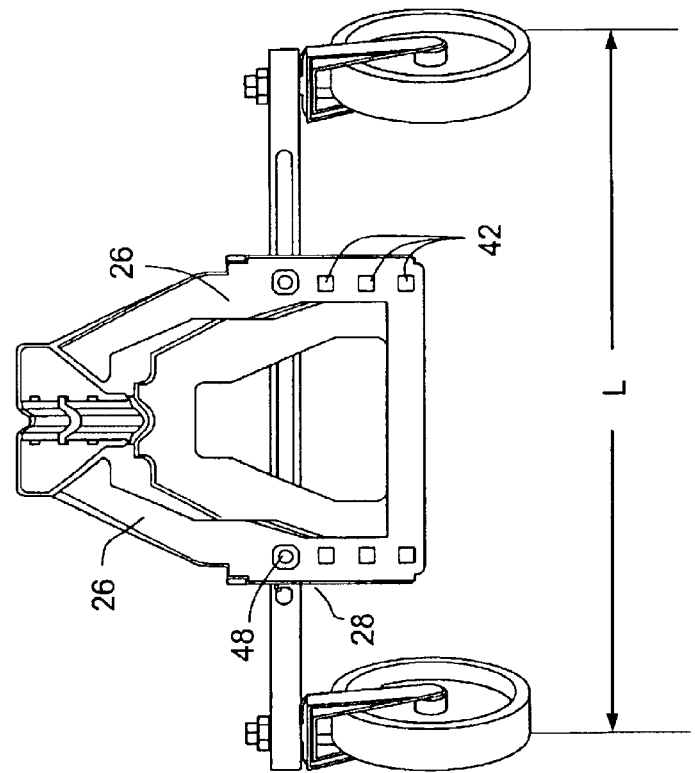
FIGS. 9A–9B show height adjustments of the axle frame relative to the main frame.
Figure 9A:
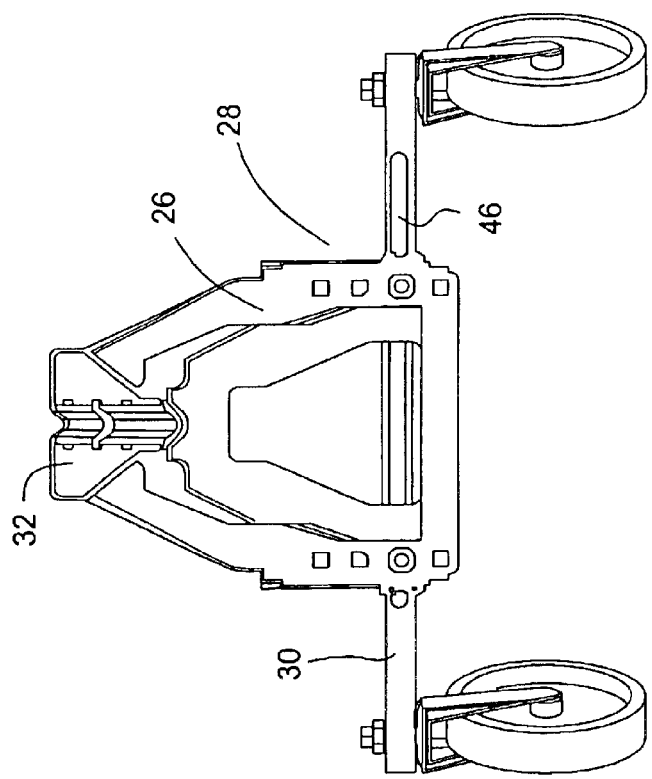
Figure 10A:
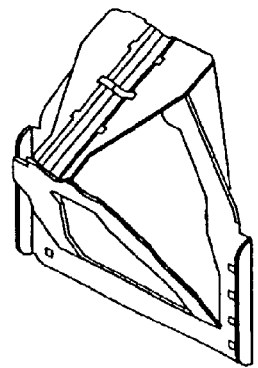
FIGS. 10A–10C are perspective views of the main frame, with axle frame, and with wheels, respectively.
Figure 10B:
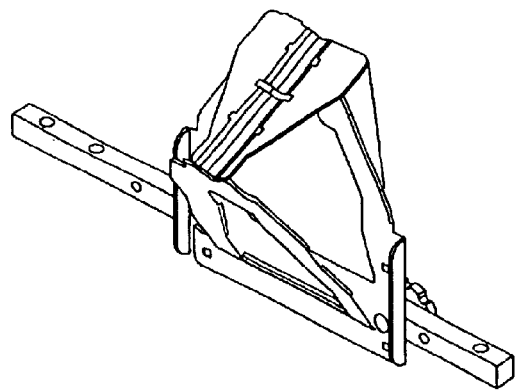
Figure 10C:
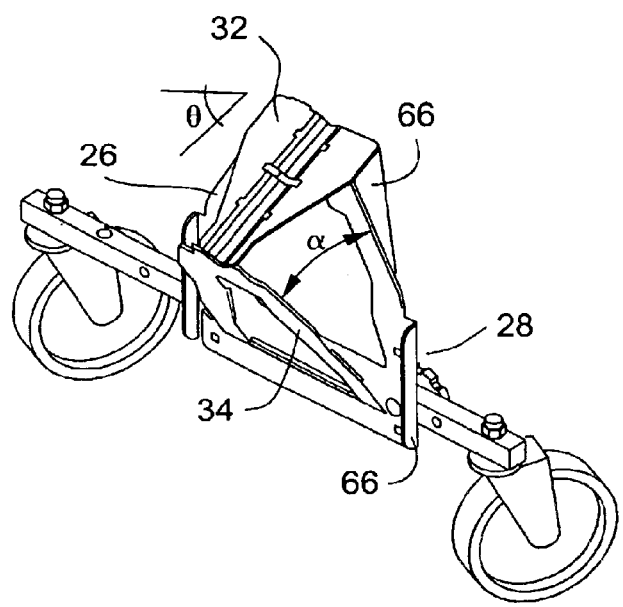

With continued reference to FIGS. 9A and 9B, the wheel base length L is preferably greater than or equal to the cutting line swath diameter. The larger wheel base provides added stability and better prevents tipping. Additionally, coupled with the ability to laterally position the axle frame 30 relative to the main frame 26, the wide wheel base maintains stability even when the one of the wheels is laterally adjusted inside the cutting swath. The main frame 26 preferably includes four openings 42 in the axle mounting section 28. The connectors 48 may comprise carriage bolts or the like secured via a quick-spin tightening knob 64 as shown in FIG. 3. The main frame 28 can be stamped from metal such as steel or aluminum. Alternatively, the frame 26 can be molded with compatible and functional copolymers as well as die cast with aluminum or lighter weight materials such as magnesium alloys. The supporting bracket 34, with reference to FIGS. 10A–10C, is preferably set at an angle α relative to the axle mounting section 28 so that the shaft receiving section 32 of the main frame 26 is set to an angle θ substantially corresponding to a shaft angle of the string trimmer to achieve a substantially horizontal and level cutting plane. As noted, the angle of the shaft receiving section 32 can be configured regardless of the shape of the main frame 26, whether triangular or otherwise. Side stiffeners and gussets 66 can be folded from the basic side plates of the main frame 26 to add rigidity to the main frame 26.

Referring again to FIGS. 1A–1D, after attaching the split collar 24 to the string trimmer shaft 18, the main frame 26 with axle frame 30 attached is engaged with the control collar 24 by inserting the collar 24 into the control collar slot 38. Subsequently, one or more trimmer clamps 50 are secured to respective trimmer clamp slots 40 and around the trimmer shaft 18 to positively secure the string trimmer shaft 18 to the main frame 26. The wheels 44 can then be secured to the axle frame 30 with a suitable connector such as screws or the like.

Figure 5C:
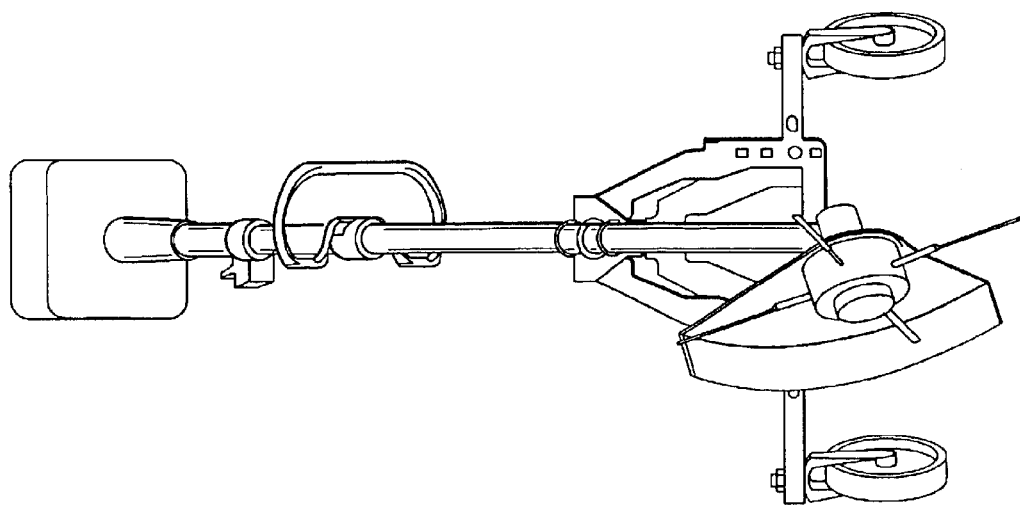
FIGS. 5A–5C show cutting head tilting options with the carriage device of the present invention.
Figure 5B:
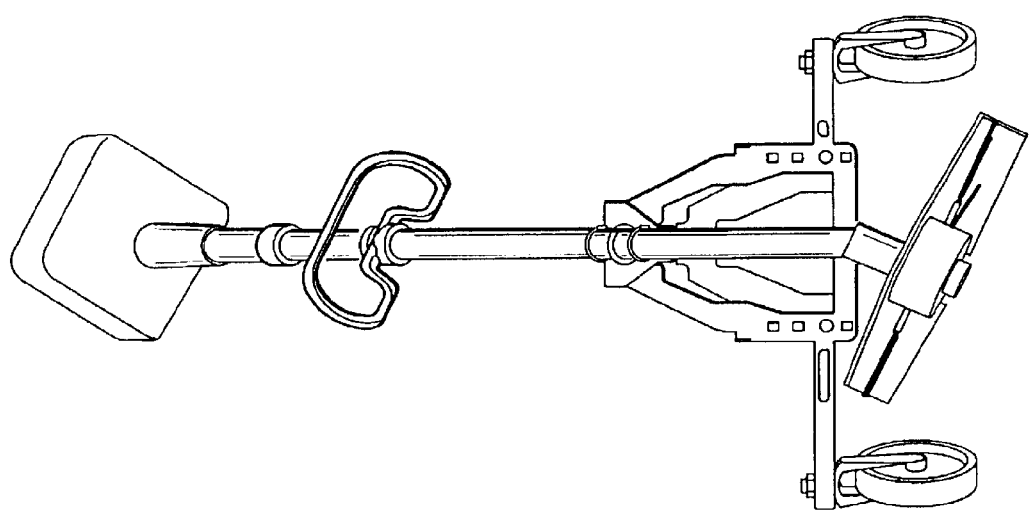
Figure 5A:
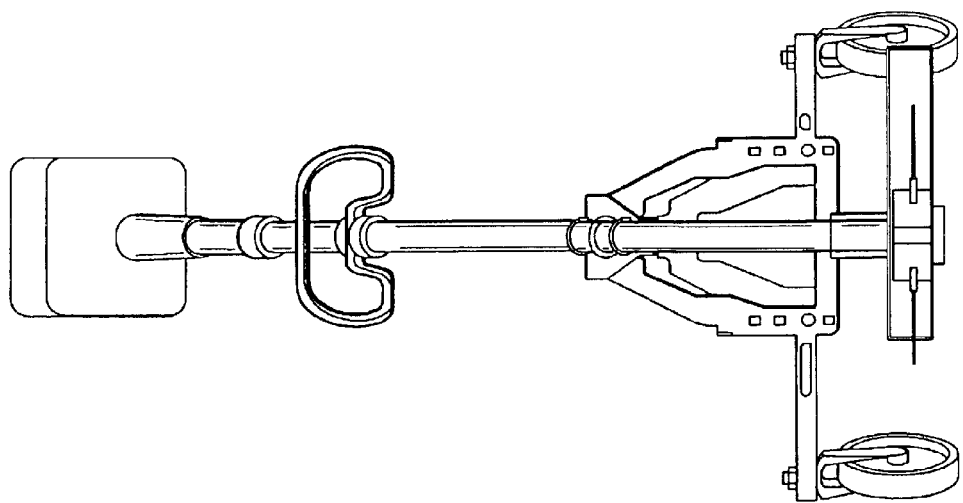

Assembled, the hose clamps 50 or like connectors can be fully tightened to lock the trimmer shaft 18 at a given head angle, to prevent its rotation or can be set adequately loose to permit trimmer head tilting. See, for example, FIGS. 5A–5C.

With reference to FIGS. 4A–4D, various configurations of the cutting height/position are shown. For example, a cutting height can be adjusted from height $H_1$ to $H_2$ by loosening the connectors 50, loosening the collar 24 if necessary, and sliding the trimmer shaft 18 within the split collar 24. The main frame 26 can also be adjusted laterally via the slot 46 in the axle frame 30. As an alternative, referring to FIGS. 9A and 9B, the connectors 50 may remain locked on the trimmer shaft 18, and the position of the main frame 26 relative to the axle frame 30 can be adjusted by adjusting a position of the connectors 48 within the openings 42 in the axle mounting section 28.

An alternative split control collar 24' is shown in FIGS. 16A and 16B. The alternative collar 24' includes an indexed disc 106 integral with or attached thereto including a plurality of circumferentially spaced apertures 108. A spring pin 110 is selectively engageable with the apertures to lock the trimmer head 20 into a specific tilt angle from the horizontal position at 0° to 30° to 90° and to 180° shaft rotation either in a clockwise or counterclockwise rotational tilt. A compression spring 112 surrounds the spring pin 110 and is configured to bias the spring pin 110 into engagement with the apertures via a lockout arm 113. A lockout stop 114 prevents the spring pin 110 from being retracted too far. The lockout stop 114 may also be utilized to lock the spring pin 110 in an opened position as shown in FIG. 16A, with the lockout stop 114 located directly behind lockout arm 113. In this manner, the spring pin 110 is pulled against the force of the spring 112 while rotating it 90° to clear the lockout stop 114, and then rotating it back 90° so as to engage an opposite side of the lockout stop 114.

The spring pin 110 can be either a loop handle or a cable connected to the operator's finger control position at the trigger zone. The pin 110 can engage at any desired angle or can be disengaged and held in the free tilting position by rotating the pin 110 180°, and pulling it outward to disengage the index disc 106.

As an alternative to the pin 110 and aperture 108 arrangement, a disc brake type arrangement may be utilized. The disc 106 would thus not need to be indexed, and a brake or caliper type mechanism can be selectively engaged with the disc to lock the trimmer head 20 into a specific tilt angle.

Figure 2:
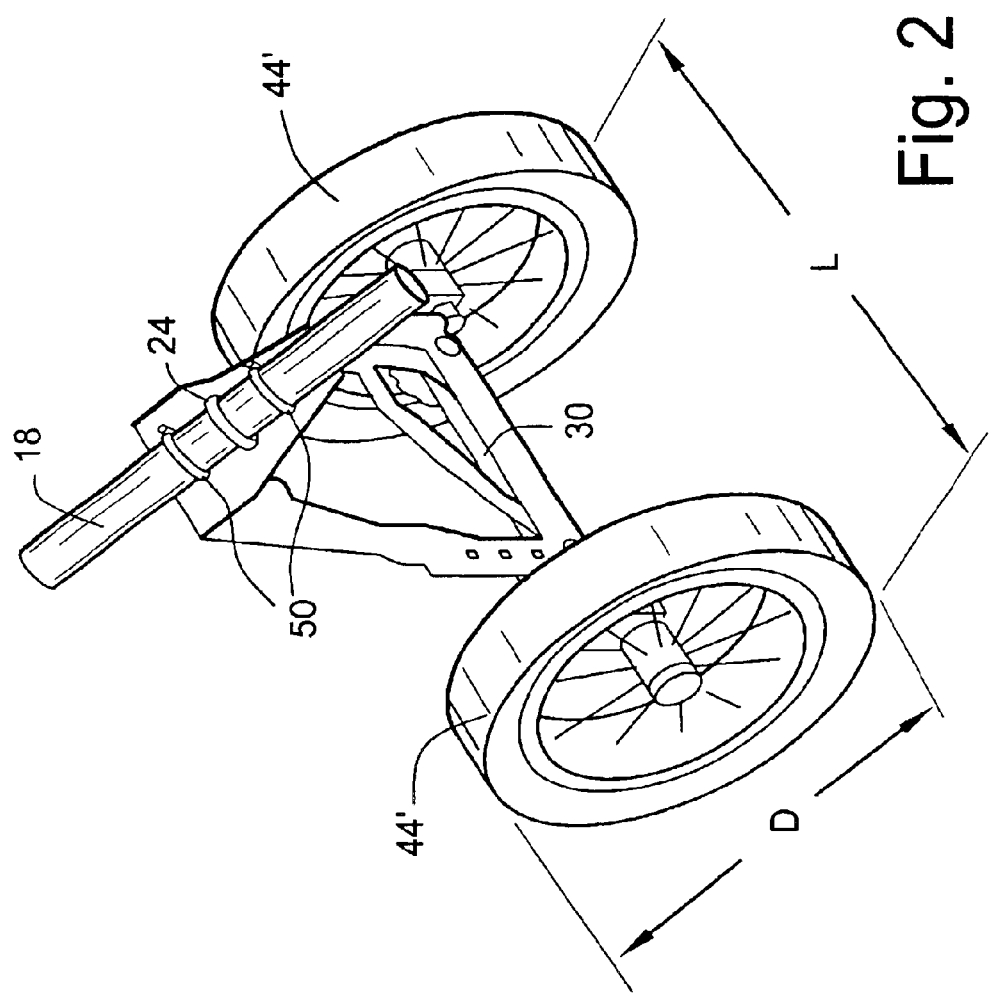
FIGS. 2 and 3 are views of a high wheel and frame embodiment of the present invention.

The axle frame 30 can readily accommodate wheel types other than the swivel wheels 44 as shown. For example, with reference to FIG. 2, the axle frame 30 itself can be readily interchanged to accommodate specialty wheels and mechanisms, such as the "high-wheel" option shown. As noted, the distance "L" between the wheels 44' is preferably greater than or equal to the cutting line swath diameter. The high wheel 44' diameter is generally greater than six inches and would not exceed fourteen inches for a conventional handheld trimmer. The high wheel option facilitates maneuverability of the device where the swivel wheels may be more restrictive such as in heavy brush or the like. As shown in FIG. 3, the axle frame 30 may be bent at ends thereof into at least two L-shaped brackets 52. The higher wheels 44' can thus be readily connected to the L-shaped brackets 52 via any suitable connector.

FIGS. 12A–12H illustrate an alternative clamp 50' for securing the trimmer shaft 18 to the shaft receiving section 32 of the main frame 26. The alternative clamp 50' is substantially J-shaped and includes a threaded connector shaft 54 extendible through one of the openings 40 in the shaft receiving section 32. The threaded connector shaft 54 receives a spring 56 that is secured in a partially compressed state via a securing nut 58 threaded on an end of the threaded connector shaft 54. The clamp 50' also includes an engagement hook 60 that is selectively insertable in the other of the holes 40 across from the hole in which the threaded connector shaft 54 is inserted. In use, the clamp 50' is biased downward via the spring 56 to provide an adequate clamping force to retain the trimmer shaft 18 in the "V" groove 36 of the main frame 26. To open the clamp 50', the clamp is simply manually lifted against the force of the spring 56 and rotated over the top of the trimmer shaft 18. Two clamps 50' are shown in the figures for the two sets of connector openings 40 in the shaft receiving section 32 of the main frame 26. The split collar 24 remains clamped to the trimmer shaft 18.

The engagement hook 60 is preferably V-shaped so as to fit round shafts of various sizes. The tension of the spring 56 can be adjusted by the securing nut 58. When connected, the trimmer shaft 18 may be rotatable in the spring-loaded clamps 50' and the V groove 36 in the shaft receiving section 32 of the main frame 26. A locking mechanism (not shown) can also be attached separately and independently and may form part of a modified split collar 24.

With continued reference to FIGS. 12A–12D, as an alternative to using both openings 40 in the shaft receiving section 32, a locator 62 for the engagement hook 60 may form part of the shaft receiving section 32. This locator 62 or locating tube is positioned in line with the free end of the engagement hook 60 to locate, pilot and maintain position of the clamp 50'. In this arrangement, when removing the clamp 50' from its locked position, the engagement hook 60 is manually pulled upward, and the free end of the clamp 50' is removed from the locator 62. If two such clamps 50' are used in the shaft receiving section 32 of the main frame 26, the locators 62 are preferably provided on opposite sides (see, for example, FIG. 12A).

FIGS. 12F–12H illustrate the simplicity of the process for attaching the carriage device of the invention when using the quick-connecting clamps 50'. The preassembled unit, including the main frame 26, axle frame 30, and clamps 50' is brought to the string trimmer shaft 18 with the control collar 24 in place. The control collar 24 is inserted into the control collar slot 38 in the shaft receiving section 32 of the main frame 26, and the quick-connecting clamps 50' are secured in place about the trimmer shaft 18.

Other means of quick convertibility may include a hinged upper cover plate with a locking but adjustable lever to apply a full lock and clamp or sufficient clearance for shaft rotation. Of course, many other mechanisms could be used for the same purpose. The combined assembly provides adjustment in multiple directions including elevation of the trimmer to comfortably fit the operator's height and arm reach through use of vertical frame holes (FIGS. 9A–9B). Additionally, the cutting height can be adjusted by enabling the trimmer shaft 18 to slide upward and downward within the loosened split control collar 24 and tightened to hold in place (see, FIGS. 4A–4D). Still further, head tilting is enabled to various angles as shown in, for example, FIGS. 5A–5C.

Figure 6:
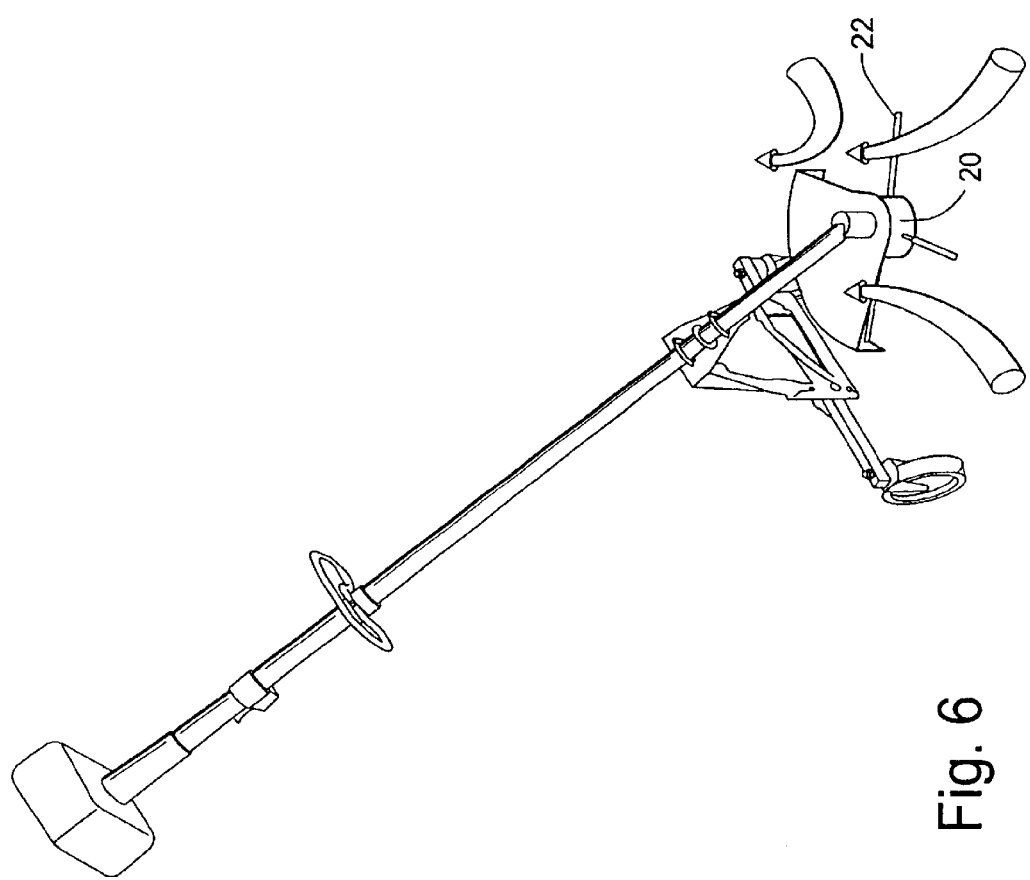
FIG. 6 illustrates the device according to the invention including a string trimmer fitted with updraft line blades.

With reference to FIG. 6, as noted above, the trimmer head 20 can be fitted with aerodynamic or specially shaped line blades 22. In FIG. 6, the line blades 22 are configured for updraft air flow tilted or pitched downward in the direction of rotation so as to "paddle" air in an upward direction. This air flow lifts and stiffens the grass for clean sharp cuts unlike conventional line. The sharper or blunt side of the line blades 22 can be tilted in a downward direction, and with a sharp leading line blade provides a sharper cut, i.e., higher kinetic energy density. With a blunt leading updraft line blade, a reasonable cut can be achieved of better quality than conventional line, while further accomplishing additional aerodynamic and lower drag benefits resulting in better power efficiency and low noise. The amount of updraft air is determined by each individual line blade displacement of air and in accordance with the rotary speed of the trimmer head 20. The air flow moves in a generally normal direction to the line blades 22 and will further incur some outward momentum due to centrifugal forces being applied to the mass of air. As a consequence, the final direction of the air flow will generally be normal to the blade but somewhat outwardly tangential to achieve an upward and outward resultant vector.

Figure 7:
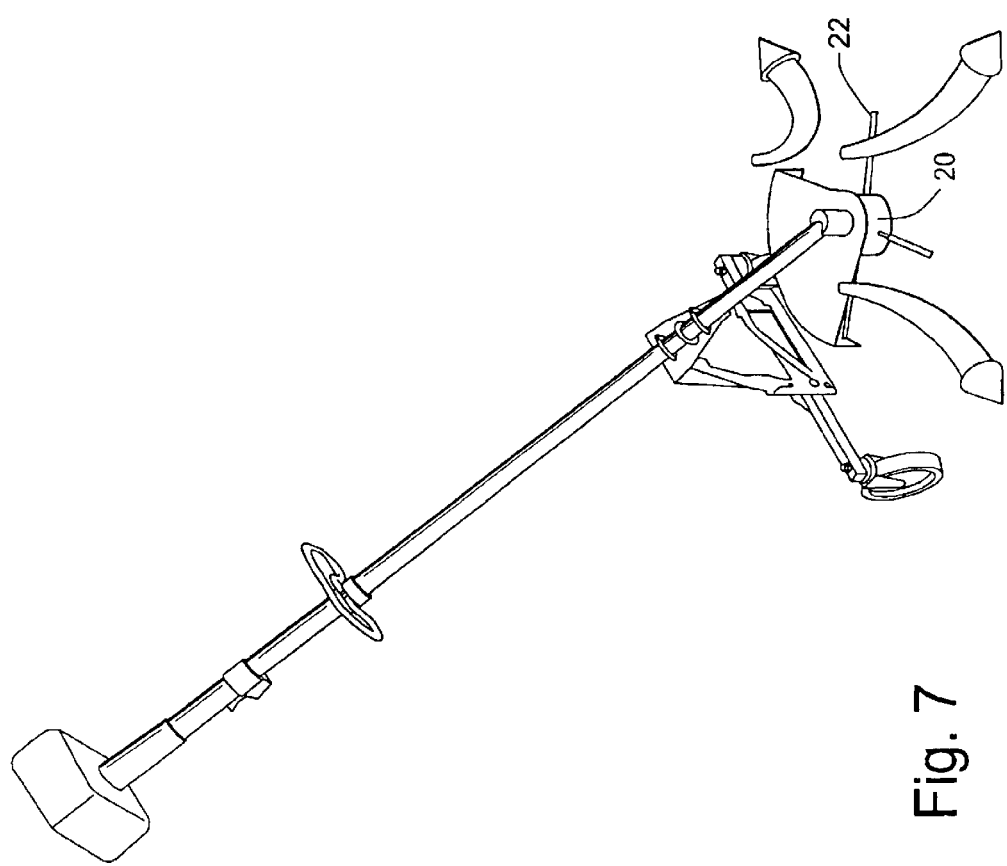
FIG. 7 illustrates the device according to the invention including a string trimmer fitted with downdraft line blades.

With reference to FIG. 7, on the other hand, special line blades 22 with a leading upward tilt into the direction of rotation creates a downward quantity of air that is useful to sweep grass and cuttings away in a blower mode. The air flow amount can be determined by the individual displacement of each line blade in accordance with its rotational speed. The blunt side of the line would be more beneficial as the leading side so as to reduce drag and reduce noise levels. The operation in this configuration is substantially quieter in relation to conventional backpack blowers or those blowers that operate with a centrifugal process using energy consuming compression and expansion processes. These line blades 22 operate in a similar manner to a boat propeller which works on a process of displacement of water. The downdraft line blades 22 operate with a downward and outward resultant vector.

Much broader manufacturing options result from this technology with ability to produce various quality cutting line grades from commercial to homeowner categories by utilizing either the low draw extrusion process or conventional injection molding with or without low draw in manufacturing the line blades. This achieves added durability benefits offered from the broad technology because of the key low stress design capability incorporated into the aerodynamic line blade system and in combination with a bilateral molecular chain within the flexible co-polymer materials employed which eliminates fibulation, often experienced with conventionally extruded and drawn lines. The bilateral molecular chain can be effected in either a molding process or an extruded process. Further, benefits of the aerodynamic flexible line blade provide up to 50 times the durability (based on comparative testing compared to conventional line) while also providing simple loading, all of which when combining other significant utility and safety benefits such that in total, offers a reasonable substitute for the rigid metal rotary mower cutting blades and their related and restrictional design requirements.

With reference to FIGS. 11A–11F, the axle mounting section 30 of the main frame 26 may be provided with a Z-frame 68 disposed in a plane substantially parallel to the ground. The Z-frame 68 includes a central aperture 70 for receiving a first axle connector 71 that secures the axle frame 30. At least one arm member 72, preferably two, is formed in an arc and includes indexed apertures 74 along the arc for selectively receiving a second axle connector 76 that further secures the axle frame 30 such that the axle frame is rotatably adjustable relative to the main frame 26. The first and second connectors preferably comprise carriage bolts or the like that are tightened via knobs such as quick-spin tightening knobs from underneath. As shown, the fastening points are located at 0°, 30°, 60° and 90°. The axle mounting section 28 of the main frame 26 is shown schematically in FIGS. 11A and 11B.

Figure 11B:
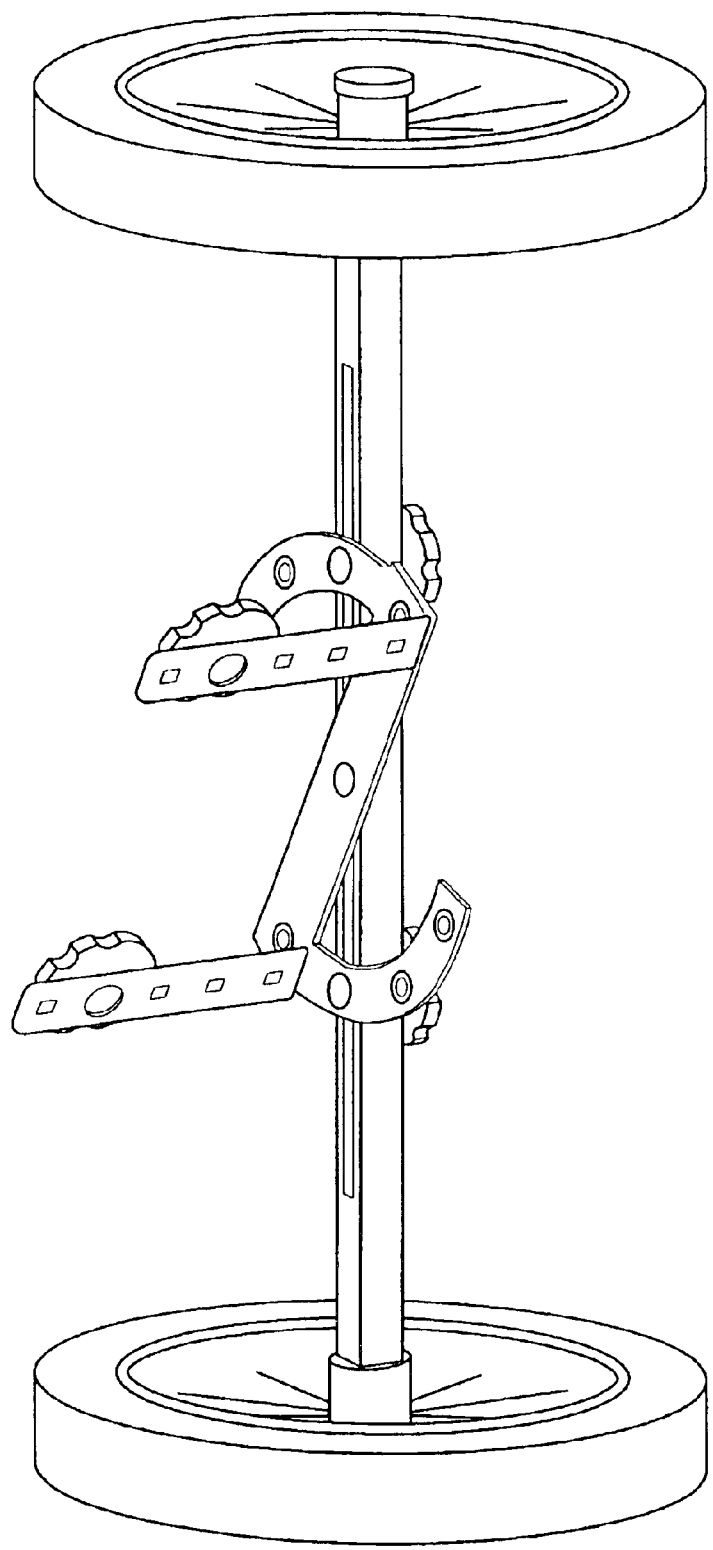
Figure 11C:
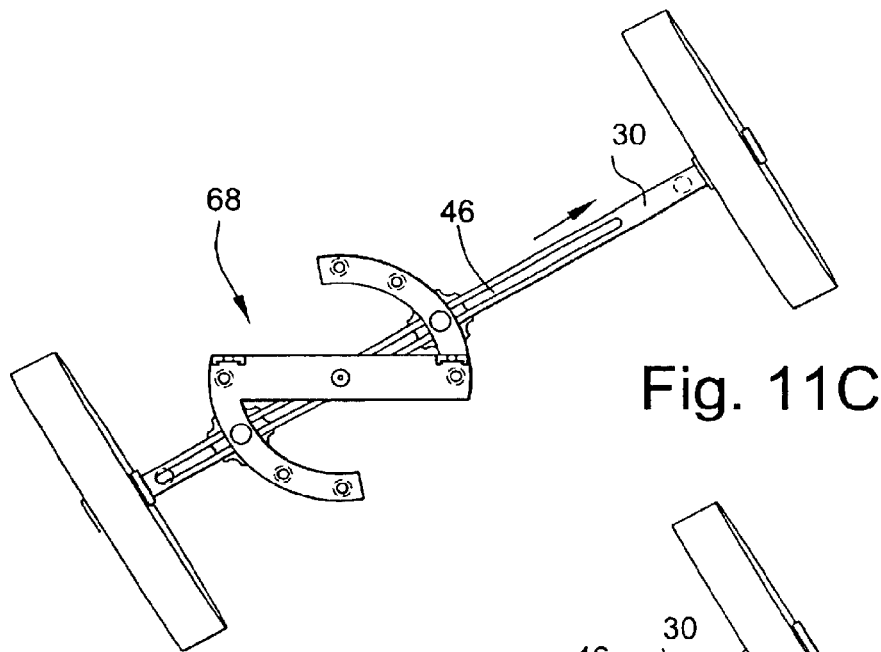
Figure 11D:
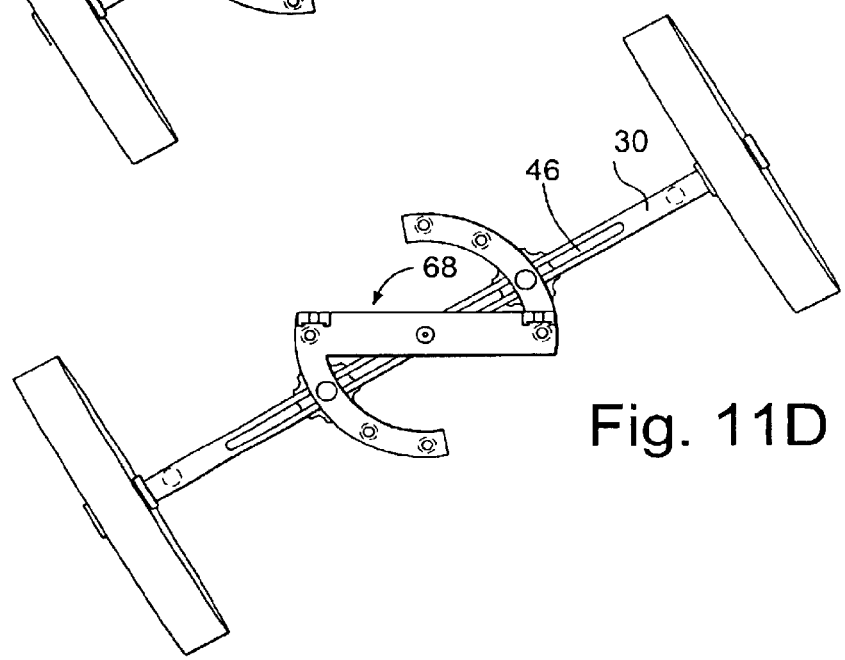
Figure 11E:
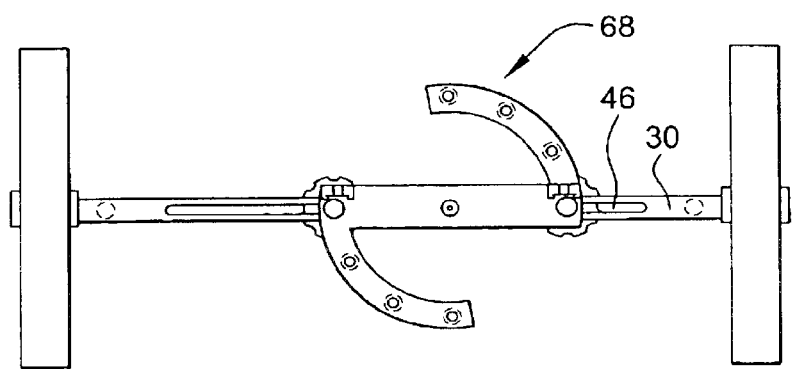

The angular positions along the arm member 72 are determined to be the corresponding parallel wheel to line blade plane positions depending on the position of the head tilt. For example, the 30° rotation of the Z-frame corresponds to a parallel wheel direction with a 90° head tilt position when the axis of the trimmer shaft 18 is positioned generally at waist level. The 90° Z-frame position is intended for use with the trimmer head 20 turned 180° and the axis of the trimmer shaft 18 more upright. The 60° Z-frame position may correspond to a swing in the opposite direction for a 90° head tilt. With particular reference to FIG. 11B, high wheel preset positions could be intended for head tilt when edging in different configurations so that the high wheels run parallel to the line blade plane. FIG. 11B also relates to a common axle that can be used for both a high wheel combination and/or for a swivel wheel combination. This combination can be attached directly to the frame without the use of a Z-frame or indirectly through a Z-frame combination. The wheels can be bolted directly into the threaded end of the axle, or the axle could utilize a 90° flange for a direct connection into the wheel's shoulder bolt. FIGS. 11C–11F show the additional ability of enabling the sliding adjustment in the slot 46 of the axle frame 30. In this case, in contrast with the swivel wheel axle, the slots 46 are vertically oriented to connect to downward pointed carriage bolts and quick spin knobs.

Figure 11F:
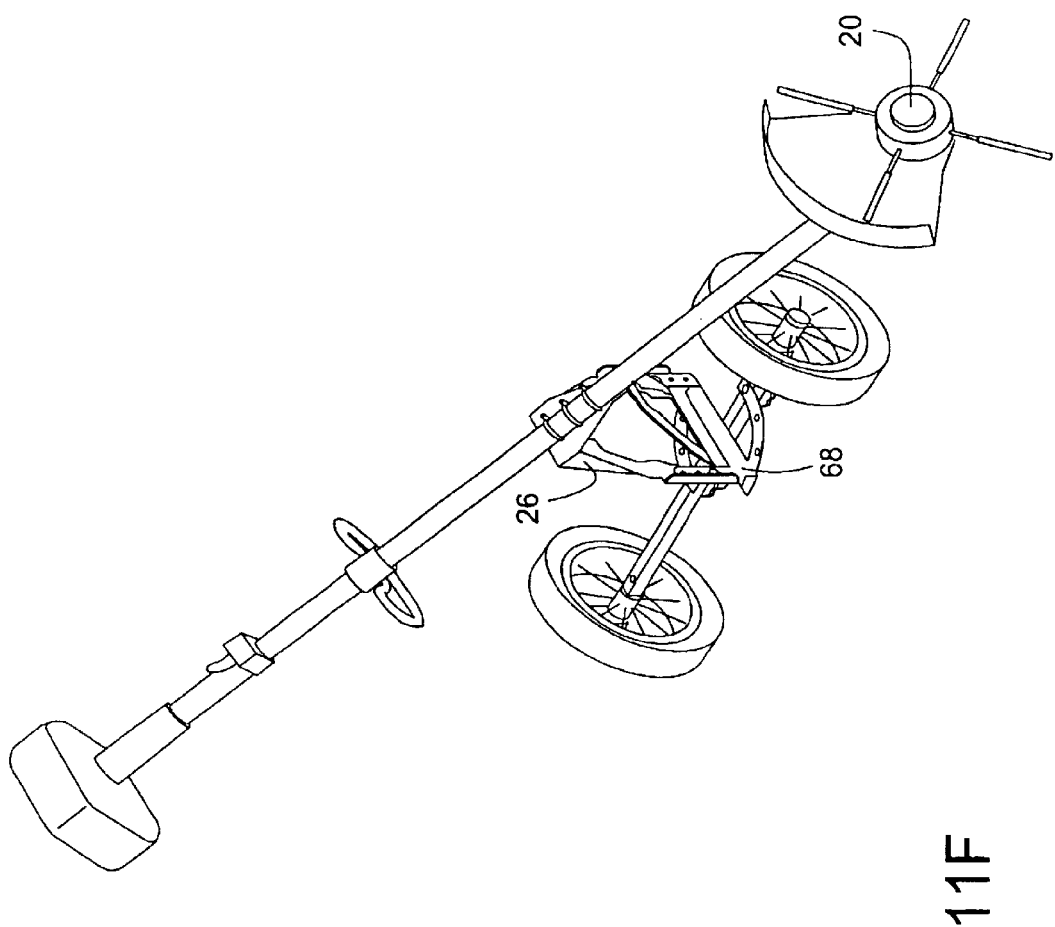
Figure 12A:
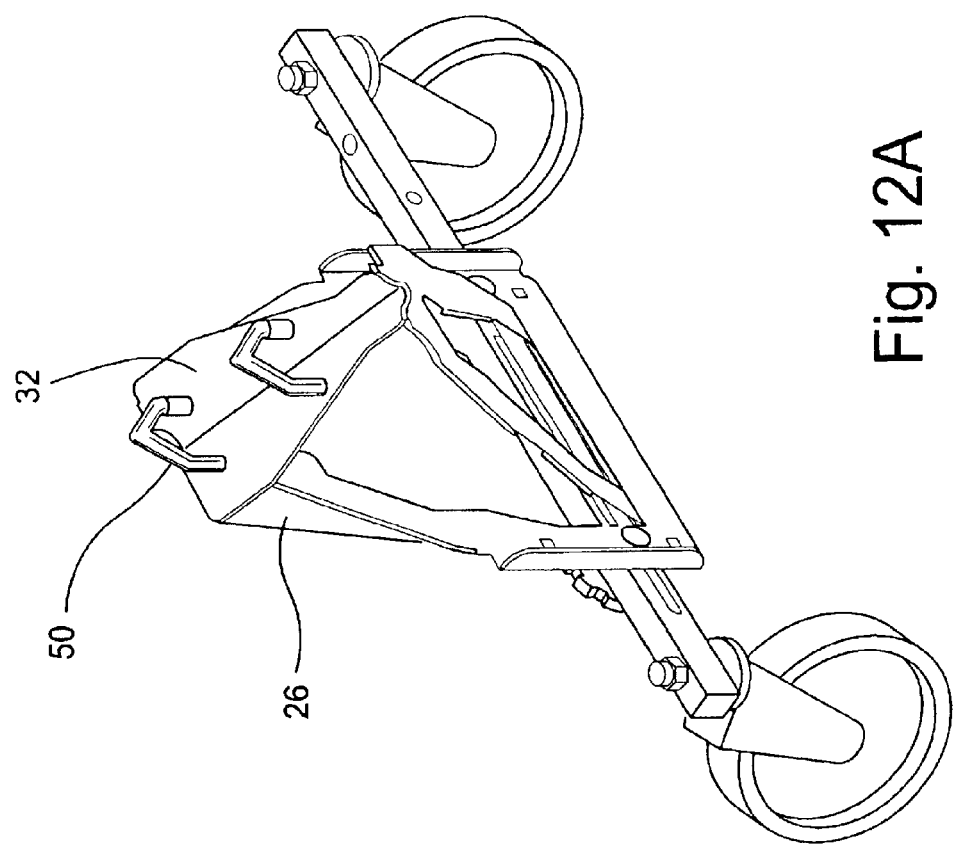
Figure 12B:
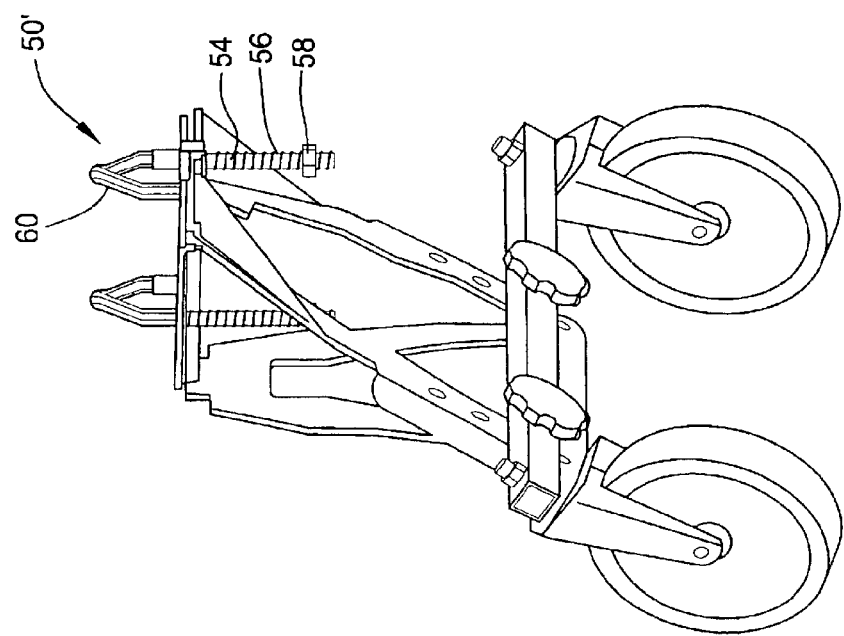
Figure 12D:
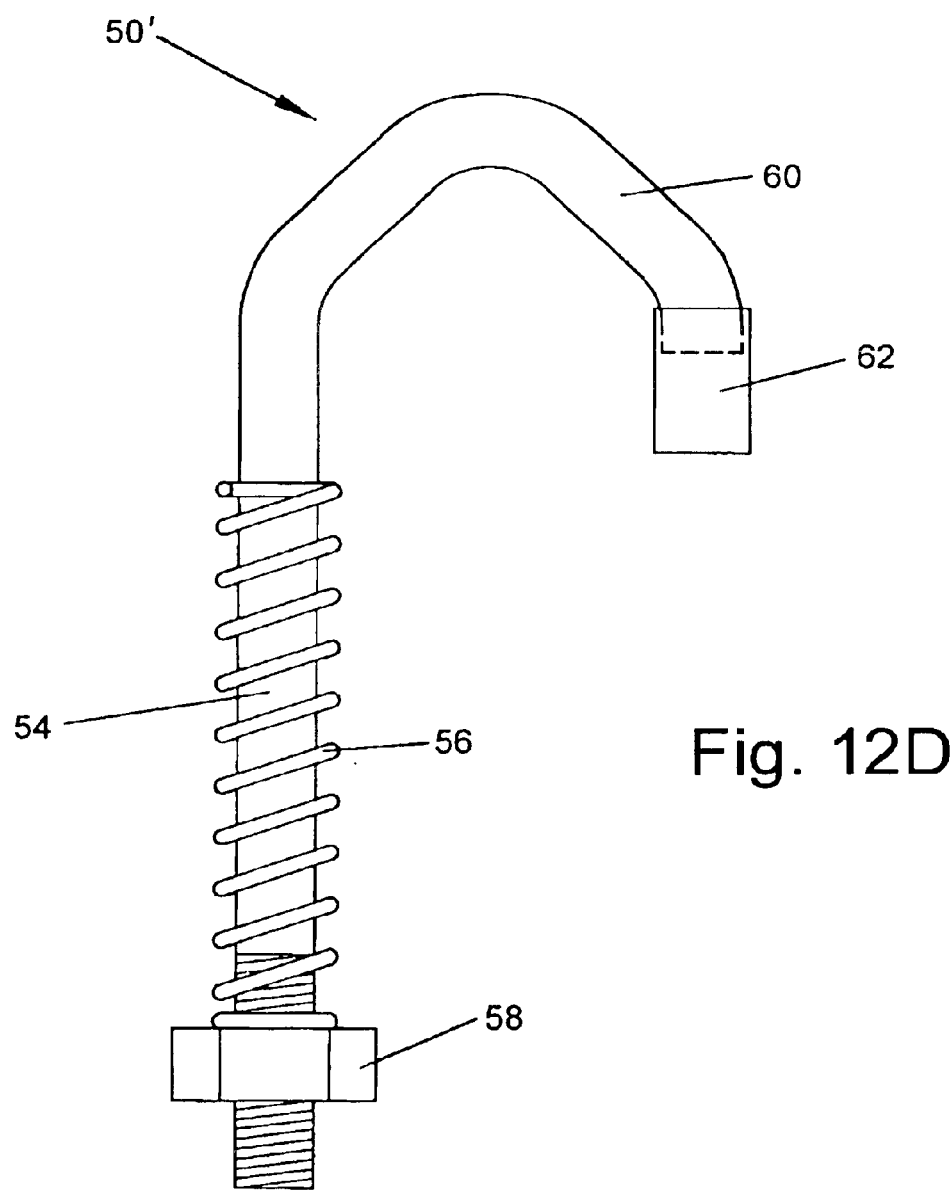
Figure 12E:
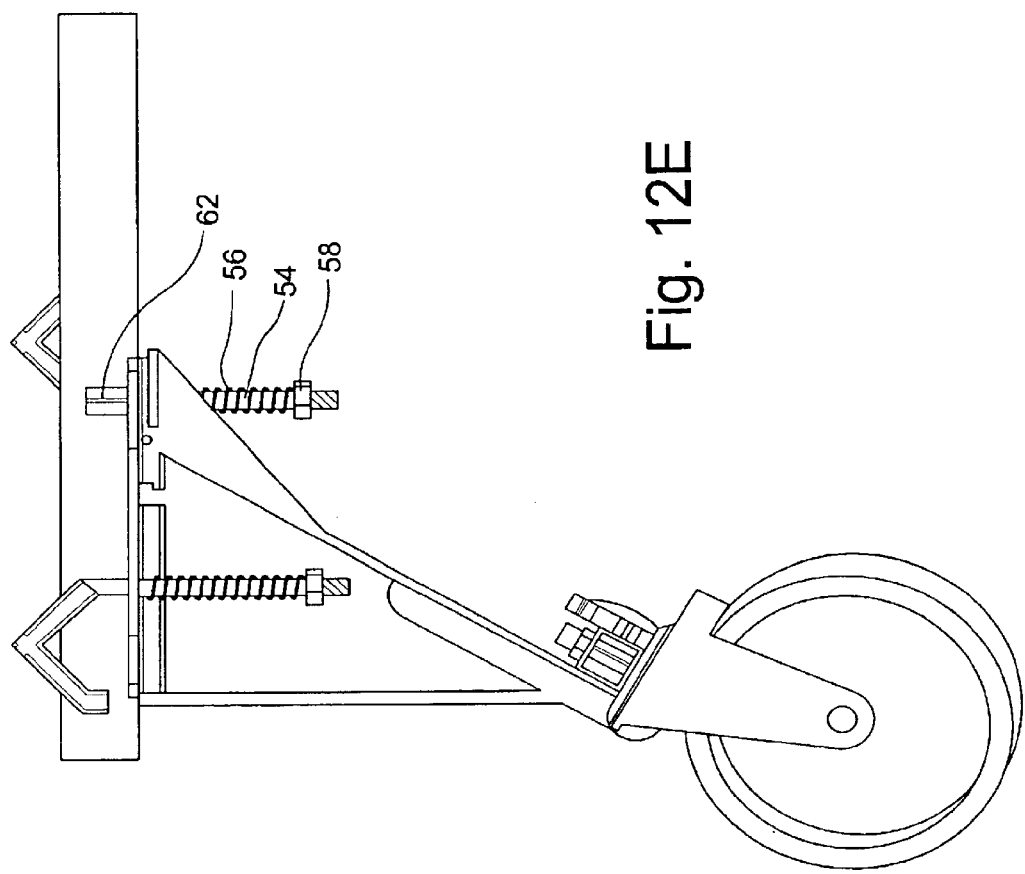

The swivel Z-frame combination allows the high wheels to be turned in such a way that they can roll parallel to the direction of head plane tilt for better linear edge control. This configuration is shown in FIG. 11F. Additionally, as mentioned above, the larger high wheels have benefits of being less prone to larger impediments as compared to swivel wheels. The Z-frame and axle assembly can be removed and replaced by a straight high wheel axle that connects directly to the frame. The high wheels rotate independently of each other and rotate around a shoulder bolt that serves as its own independent axle. The high wheel straight axle as well as the high wheel Z-frame combination is slotted to slide the wheels in either direction so as to clear the potential interference with the trimmer's guard and further to allow the trimmer swath to cut beyond the wheels even though the wheel base length is greater than the cutting swath.

Figure 13A:
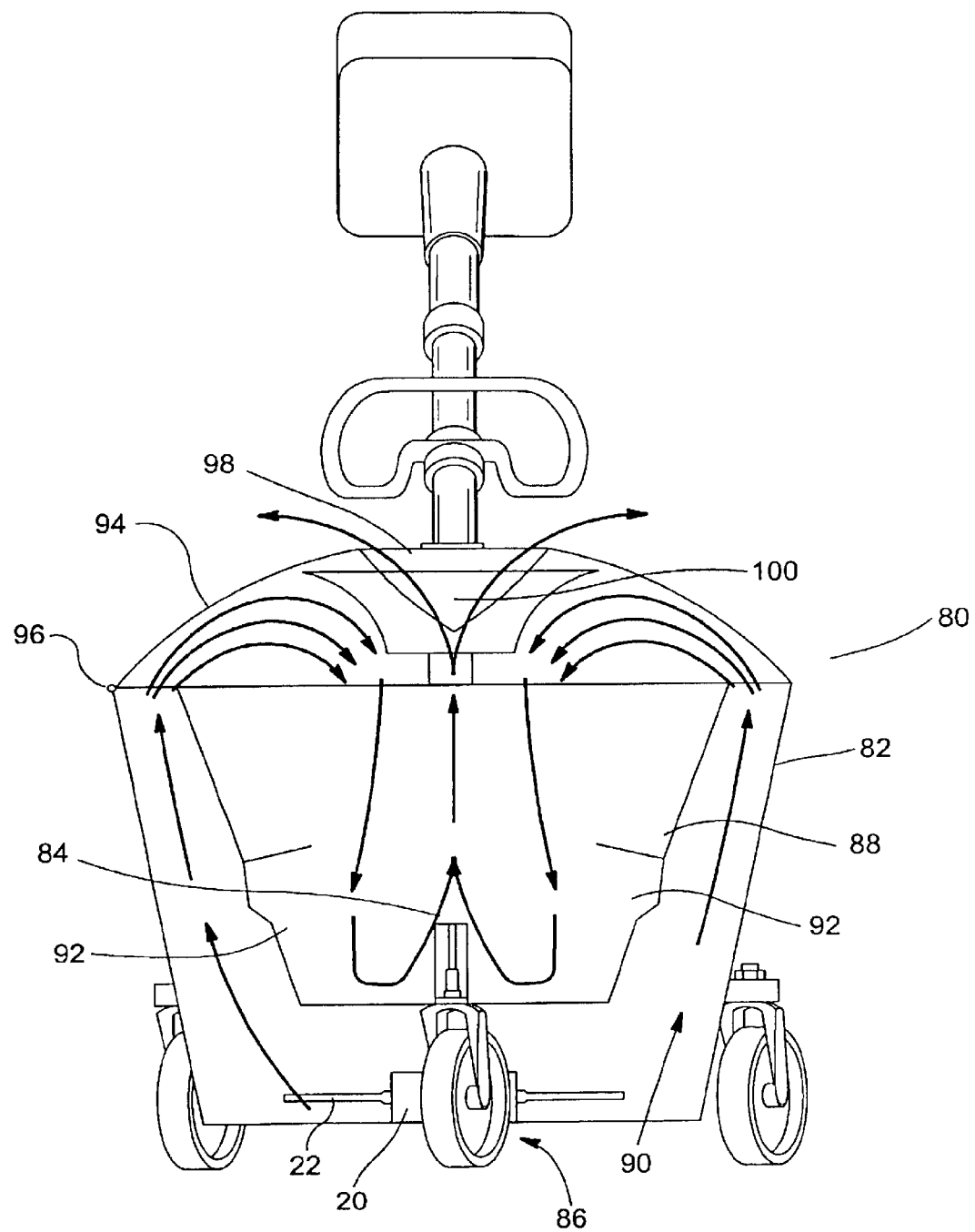
FIGS. 13A–13C show an application of the present invention including a mulcher.
Figure 13B:
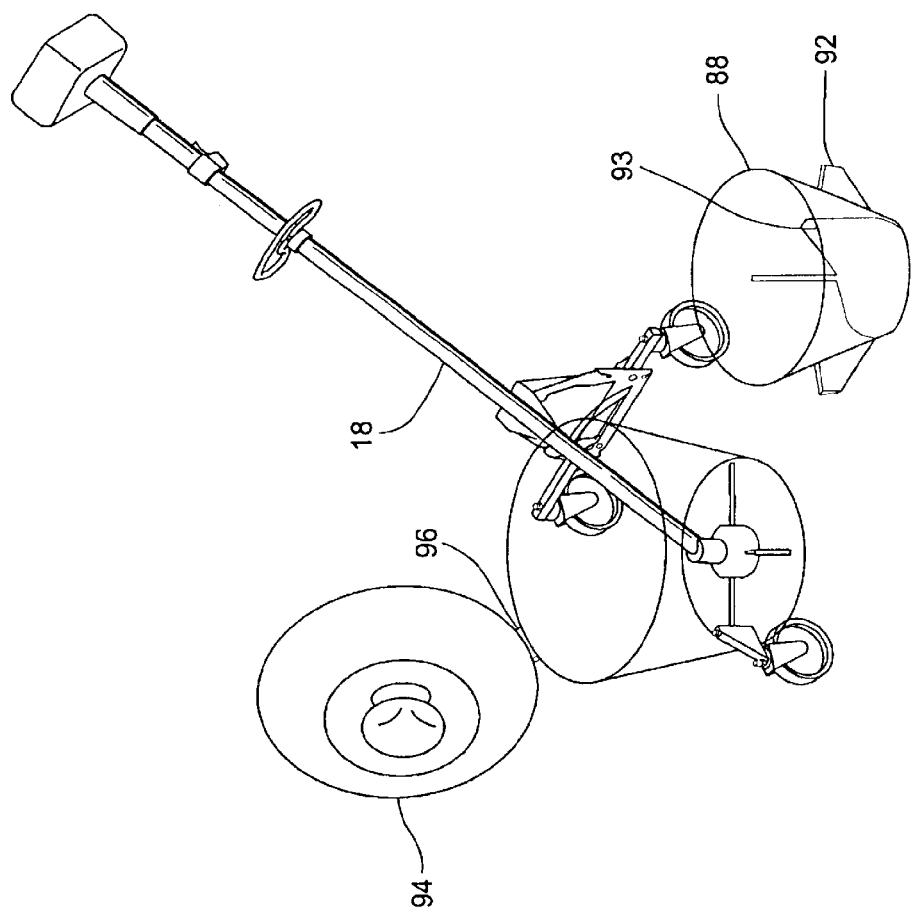
Figure 13C:
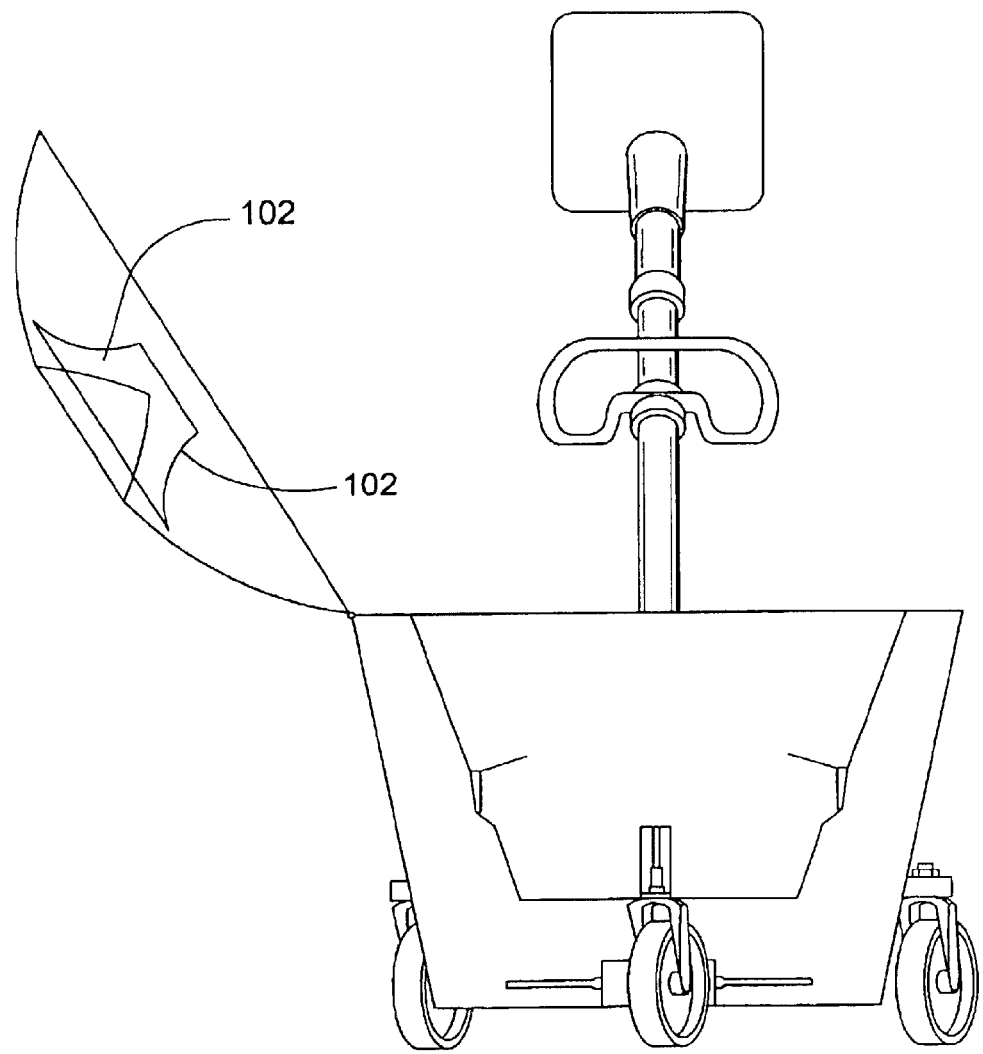

With reference to FIGS. 13A–13C, a tub mulcher and vacuum system application is shown in conjunction with the carriage device according to the present invention. The mulcher attachment 80 includes a mulcher tub 82 having a slot 84 on a trimmer shaft side of the mulcher tub and a wheel assembly 86 on an opposite side thereof. An inner collecting tub 88 is disposed within the outer mulcher tub 82 radially spaced from an inside wall of the mulcher tub 82 defining a circumferential channel 90 therebetween. The collecting tub 88 is provided with a trimmer shaft locating frame 93 to accommodate the trimmer shaft 18. Preferably, the mounting slot 84 and locating frame 93 are sized such that the mulcher tub 82 is substantially level when mounted on the string trimmer shaft 18 with the wheel of the wheel assembly 86 contacting the ground. As shown, the collecting tub 88 is provided with spacer ribs 92 or the like to maintain the spacing between the collecting tub 88 and the mulcher tub 82. These ribs, however, may alternatively be secured to an inner wall of the mulcher tub 82. Of course, other means for effecting the space between the collecting tub 88 and the mulcher tub 82 may be utilized. A tub lid 94 is pivotally secured to the mulcher tub 82 via a hinge 96. As shown, a bottom of the mulcher tub 82 is open, and the head 20 and line blades 22 of the string trimmer operate about ½ inch above the mulcher tub 82 bottom. The collecting tub 88, shown in FIGS. 13A and 13C, rests within the mulcher tub 82 above the trimmer head 20.

The trimmer head 20 is preferably fitted with updraft line blades 22 for the mulcher application. Within the range of two to seven inches or more from the ground level, the updraft line blades 22 create a vacuum and pull leaves or other loose brush upward directly into the fast high speed rotary line blades 22. The leaves and brush are immediately chopped and mulched at this low elevation level, and both mulch and air mix and travel in an upward direction within the channel 90 between the inner collecting tub 88 and the outer mulching tub 82. The mulch and air combination makes a turn at the top via a contoured surface 102 of the lid 94 which redirects the flow to allow the mulch to fall into and within the collecting tub 88. Air is discharged through an exhaust top port 98 that is covered by a porous or fine wire or cloth mesh 100. The lid 94 opens after release of a clamp or the like and swings on the hinge 96. When the collecting tub 88 is full, the mulcher lid 94 is lifted out of the way on its hinge 96, and the tub 88 is manually lifted out of the assembly. The mulched material is dumped and the empty basket is placed back into the assembly locating itself via the trimmer shaft locating frame 93. The upper lid 94 is then closed, clamped and ready for operation and filling. The upper lid can alternatively be made of porous materials to entrap mulch yet allow air to exhaust. This tub system can also be utilized as an effective garden vacuum to remove and collect grass cuttings, general yard debris, dust and other cuttings. The system is also designed to be anti-clog, wherein if a mulch or stick clog occurs, a simple removal of the collecting tub 88 removes the clog. The system can be made removable in its entirety or can be separately sold as a fully integrated tool. The basic system can also function very similar to a conventional tubing outlet for a mulch material to travel through and to be transferred into a suspended collection bag.

The mulcher application according to the present invention has many advantages compared to the present state of the art in that it lifts vegetation (leaves, grass, etc.) and mulches within two to seven inches of its ground location. The flexible line blades uniquely create both the updraft and perform mulching at very high speeds with high impact and high kinetic energy density chopping. The system is capable of absorbing twigs and branches without clogging because the line blades can grind larger debris. Current shredder bagger systems include a large duct that extends in great length from the grinder downward to the ground level where the large leaves or pieces of vegetation are intended to be drawn up through the bulky transfer to the cutting section, where the material is ground by a centrifugal impeller that forces the mulched material out to a collection or bagging system. The application according to the present invention eliminates the long bulky and inefficient inlet passageway and transfer volume and further eliminates the inefficient centrifugal fan mechanism. Other types of mower shredders and larger complex systems involve a similar type large inlet volume collector tube that draws air and leaves into a secondary mulching system, which is then followed by a booster air pump to further push the material to its final depositing and collection system.

The mulcher application of the invention can extend from small garden type vacuum mulcher systems to large tractor drawn type equipment. The use of flexible line blades allows resiliency and impact reduction when confronted with rocks and other high impact materials that could damage more brittle blades and further cause other hazards. The mulcher application differs from a rotary type lawn mower that converts itself to a collector bagger in that it utilizes a flexible line blade and an immediate passageway directly above as opposed to a side discharge that eventually leads to a bagged collection system. It utilizes a simple and efficient means of opening the lid and removing an internal tub collector to dump its contents.

Both the inner and outer tubs can be manufactured from conventional materials in a manner similar to that in which trash cans are made from stamping of either steel, aluminum or molding or blow molding of combination copolymer materials. The size of the mulcher application can vary depending on the collection volumes and can be classified for example as two to ten to thirty gallon capacities and can expand to much larger systems. The total system can also mow, mulch and collect in one operation. Its elevation from the ground is adjustable upward or downward by the convenience of the wheel systems discussed above.

Testing has shown that this system is capable of mulching leaves to less than 10% of their original volume. This testing was successfully accomplished with a 25 cc two-cycle engine trimmer combination which proved to be very efficient with its pick up and mulching capability while being very quiet in operation as the noise level of this process is much lower because there is no compression of air within this cycle and the system is further shielded from the outside. The system can operate at lower high speeds as desired by the operator who controls the trigger of the trimmer. Additionally, it can be powered by two-cycle or four-cycle engines and/or electric motors both AC and cordless.

Figure 14:
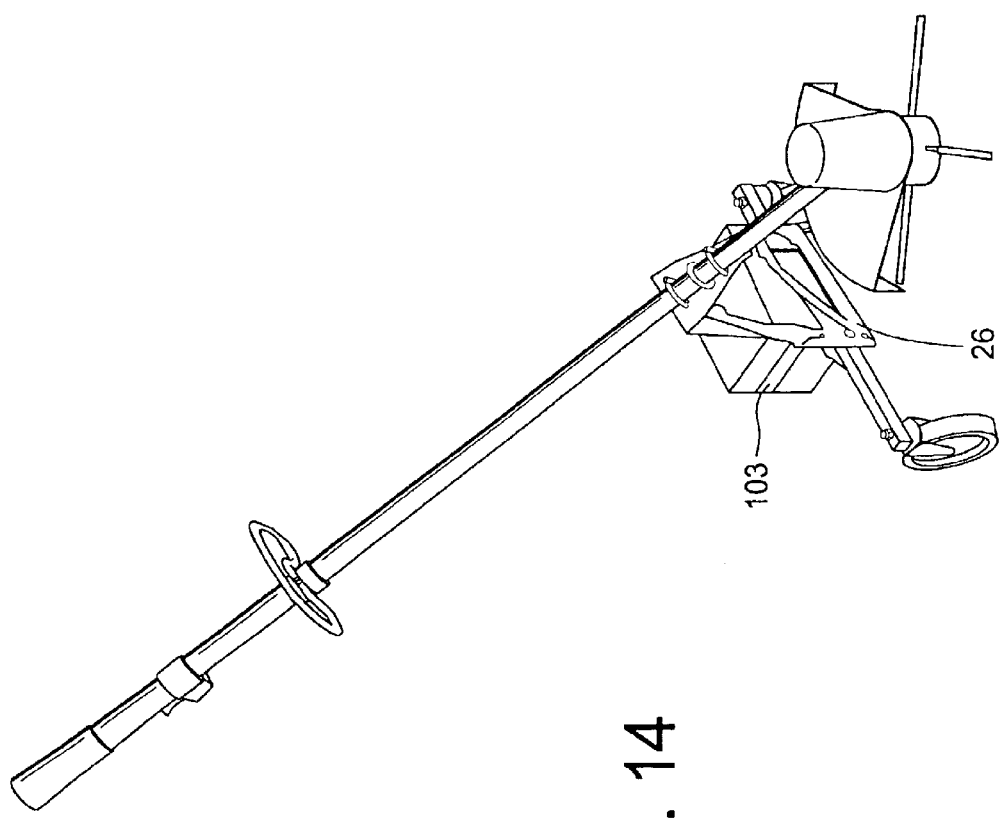
FIG. 14 is a perspective view of the carriage device according to the present invention including a battery clamp.
Figures 15A, 15B, 15C:
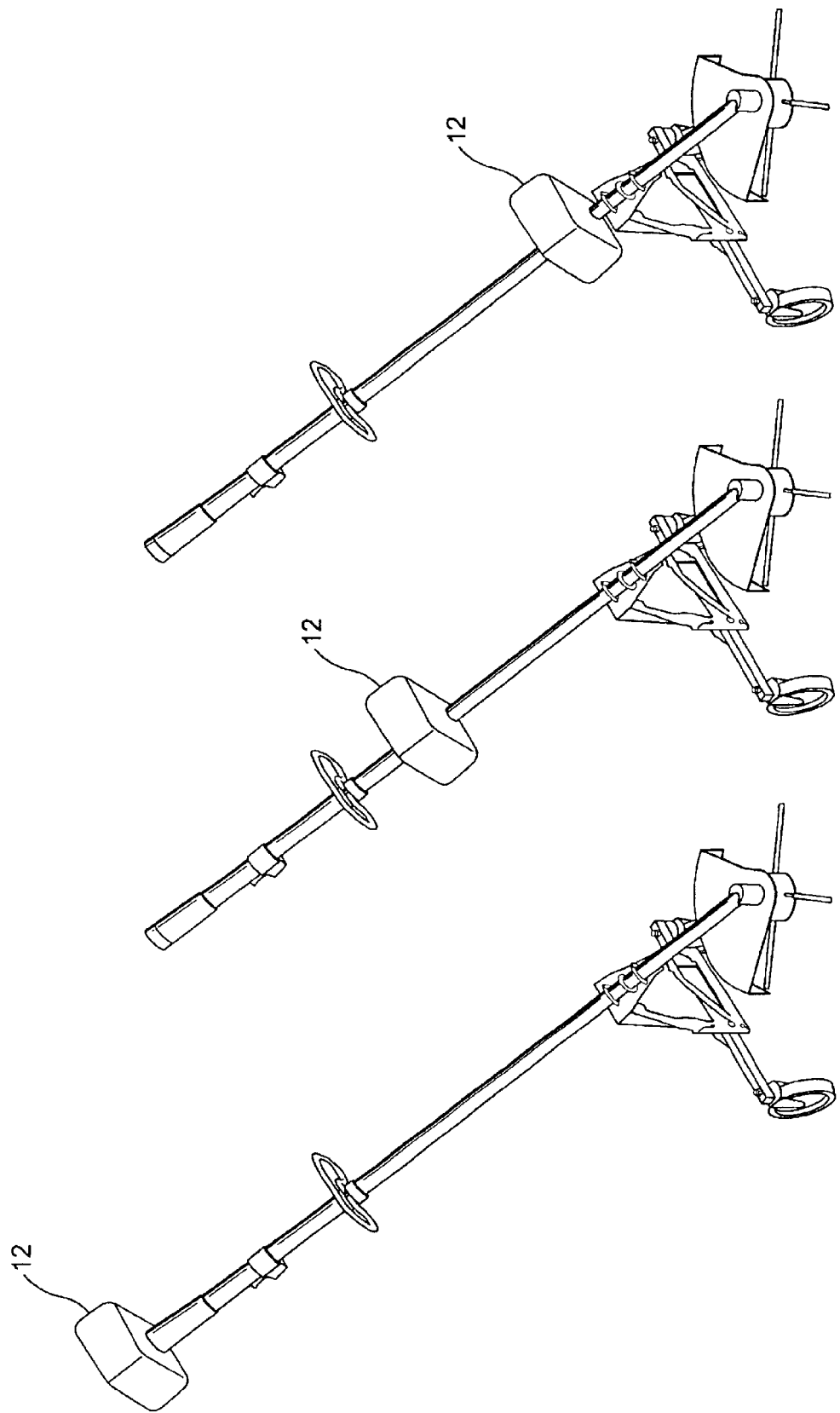
FIGS. 15A–15C show alternate positions for the string trimmer power head.
Figure 17A:
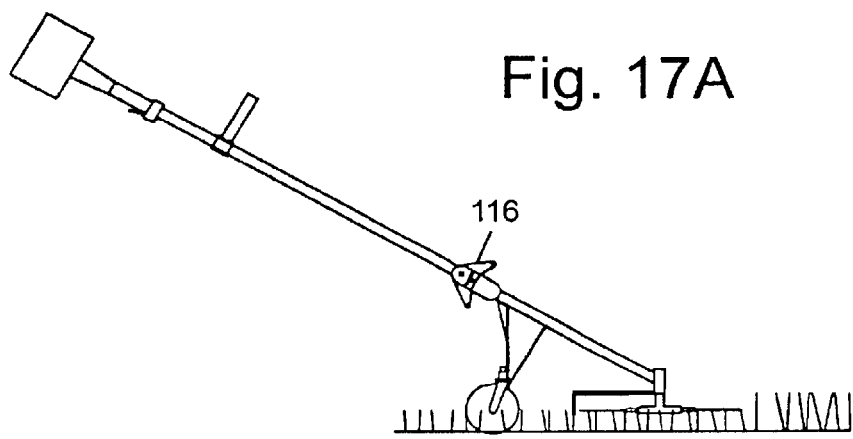
FIG. 17 shows the carriage of the invention utilizing a universal joint.
Figure 17B:
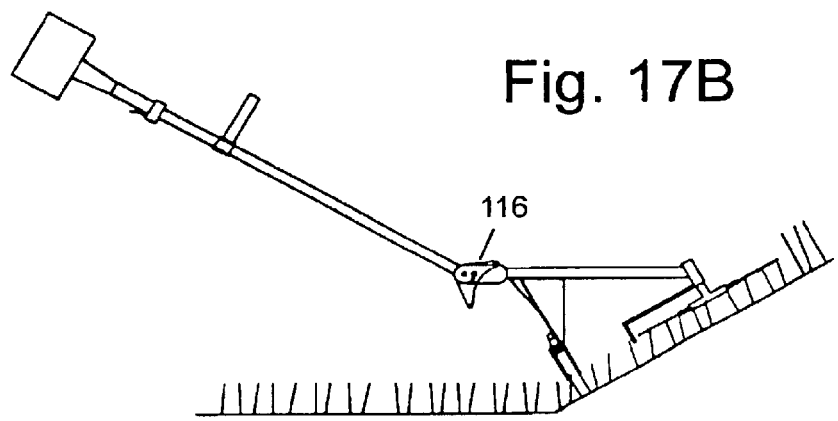
Figure 17C:
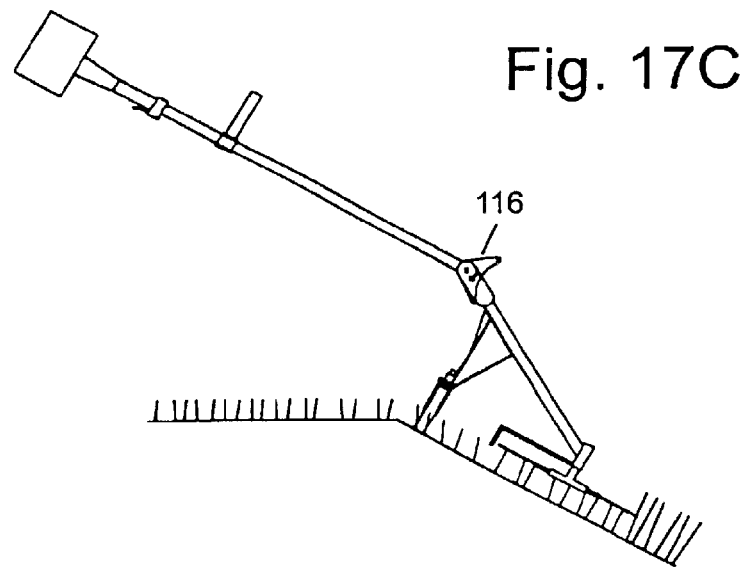

In another application of the present invention, with reference to FIG. 14, an electric cordless trimmer can be utilized with the carriage device of the present invention incorporating a battery bracket 103 secured to the main frame 26 for supporting a powerful and sizeable DC battery. The system is equipped with updraft or downdraft line blade combinations particularly with the leading blunt section of the air foil. This allows tremendous aerodynamic efficiency and low drag which is particularly well suited for the limited power stored in the DC battery. An electric motor can be mounted on the handle end or directly over the axle or the head location. Additionally, as shown in FIGS. 15A–15C, the power head 12 can be set in a position to create a balance weight over the swivel axle. The tub mulching application can also be added to achieve a multitask cordless combination mower, trimmer, edger, blower and garden vacuum system. Extensive tests comparing performance of similar sized aerodynamic line to conventional line successfully accomplished doubling of the battery running time and doubling of the cutting rate at the same time. Still further, with reference to FIG. 17, a universal joint 116 providing an option for shaft angle positioning may be provided similar to an automotive steering wheel tilt mechanism. With known internal flex drive cable or the like, power can be transmitted through the three or more position configurations shown in FIG. 17 to allow the operator to select a more comfortable and reachable shaft control positions when mowing up or down steep slopes.

With the carriage device according to the present invention, a multi-functional yard accessory can be used for a host of applications including mowing, trimming, edging, mulching, blowing, etc. using a simple apparatus and a string trimmer. If the trimmer is fitted with aerodynamic-shaped line blades, even additional functionality can be achieved with quieter and more efficient operation as well as more effective operation. The simple construction can generally be configured to work with existing string trimmers and can thus be sold in a user-installed kit. As a result of the simple construction, the device can also be manufactured inexpensively.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A carriage device for a string trimmer comprising:
   an axle frame supporting at least two wheels; and
   a main frame including an axle mounting section for adjustably securing the axle frame relative to the main frame and a shaft receiving section shaped to receive a string trimmer shaft,
   wherein the axle mounting section comprises a plurality of connecting areas for selectively adjusting a height of the main frame relative to ground by adjusting a position of the axle frame on the axle mounting section, and wherein the axle frame is laterally adjustable relative to the main frame, and
   wherein the axle mounting section comprises a plurality of holes aligned in at least one column, and wherein the axle frame comprises an internal slot for each column of holes, each internal slot receiving an axle connector when aligned with a respective hole.

2. A carriage device for a string trimmer comprising:
   an axle frame supporting at least two wheels; and
   a main frame including an axle mounting section for adjustably securing the axle frame relative to the main frame and a shaft receiving section shaped to receive a string trimmer shaft,
   wherein the axle mounting section comprises a plurality of connecting areas for selectively adjusting a height of the main frame relative to ground by adjusting a position of the axle frame on the axle mounting section, without affecting an angle of the axle frame relative to the main frame, wherein the shaft receiving section comprises a control collar slot that is shaped to receive a control collar fixed to the string trimmer shaft and at least one trimmer clamp slot that receives a trimmer clamp for securing the string trimmer shaft to the main frame, and wherein the shape of the control collar slot prevents linear displacement of the string trimmer shaft while permitting rotation of the string trimmer shaft.

3. A carriage device according to claim 2, comprising two trimmer clamp slots disposed on opposite sides of the control collar slot, the trimmer clamp slots receiving a corresponding two trimmer clamps for securing the string trimmer shaft to the main frame.

4. A carriage device according to claim 2, wherein the trimmer clamp is a pipe clamp.

5. A carriage device according to claim 2, wherein each trimmer clamp slot comprises two openings in the shaft receiving section, and wherein the trimmer clamp is a spring-loaded J-clamp including a threaded connector shaft extendable through one of the openings and receiving a spring and a securing nut on an end thereof for holding and compressing the spring, and an engagement hook shaped to extend over the string trimmer shaft and insertable into the other of the openings.

6. A carriage device according to claim 5, wherein the engagement hook is V-shaped.

7. A vegetation cutter comprising:
   a string trimmer having a string trimmer shaft; and
   a carriage device supporting the string trimmer and including:
      an axle frame supporting at least two wheels, and
      a main frame including an axle mounting section for adjustably securing the axle frame relative to the main frame and a shaft receiving section adjustably securing the string trimmer shaft,
   wherein the axle mounting section comprises a plurality of connecting areas for selectively adjusting a height of the main frame relative to ground by adjusting a position of the axle frame on the axle mounting section, and wherein the axle frame is laterally adjustable relative to the main frame.

8. A vegetation cutter according to claim 7, wherein the shaft receiving section secures the string trimmer shaft for longitudinal adjustment and rotational adjustment.

9. A vegetation cutter according to claim 7, wherein the string trimmer comprises a trimmer head with updraft line blades, and wherein the vegetation cutter further comprises a mulcher tub disposed surrounding the trimmer head and updraft line blades.

10. A vegetation cutter according to claim 9, wherein the mulcher tub comprises a mounting slot on a front side that is shaped to fit over the string trimmer shaft and a wheel assembly including a wheel on a back side, wherein the mounting slot is sized such that the mulcher tub is substantially level when mounted on the string trimmer shaft with the wheel of the wheel assembly contacting the ground.

11. A vegetation cutter according to claim 9, wherein the mulcher tub comprises an outer tub including a tub lid and an open base, and an inner collecting tub disposed within the outer tub and radially spaced from an inside wall of the outer tub defining a channel therebetween.

12. A vegetation cutter according to claim 11, wherein the tub lid comprises a contoured portion for directing mulched material from the channel into the inner collecting tub and a screened discharge port for discharging air from the channel.

13. A vegetation cutter according to claim 7, wherein the string trimmer shaft comprises a universal joint.

14. A vegetation cutter according to claim 7, further comprising a control collar secured to the string trimmer shaft, the control collar being engageable with a slot in the shaft receiving section of the main frame, wherein the engagement between the control collar and the slot prevents linear displacement of the string trimmer shaft while permitting rotation of the string trimmer shaft.

15. A vegetation cutter according to claim 14, wherein the control collar comprises a two-piece unit surrounding the string trimmer shaft, wherein each of the control collar pieces is V-shaped.

16. A vegetation cutter according to claim 14, wherein the control collar comprises:
   an indexed disc including a plurality of circumferentially spaced apertures; and
   a spring pin having a shaft and being selectively engageable with the apertures to lock the string trimmer into a specific tilt angle, the spring pin being biased into engagement with the apertures via a spring mounted on the shaft.

17. A vegetation cutter according to claim 7, wherein the string trimmer comprises a rotatable head supporting a plurality of flexible line blades, wherein the line blades are selectively configurable in alternative configurations to generate an updraft or a downdraft during operation.

18. A vegetation cutter according to claim 17, wherein when the flexible line blades are configured to generate a downdraft during operation, the vegetation cutter functions as an open line paddle type blower.

19. A vegetation cutter according to claim 17, wherein the flexible line blades comprise an aerodynamically shaped cross-section including a sharp edge and a blunt edge, and wherein the line blades are selectively configurable in alternative configurations with the blunt edge leading or with the sharp edge leading.

20. A vegetation cutter according to claim 7, wherein the string trimmer comprises a plurality of line blades defining a cutting swath having a cutting swath diameter, and wherein the axle frame supports two wheels having a wheel base, a length of the wheel base being greater than or equal to the cutting swath diameter.

21. A vegetation cutter according to claim 20, wherein the axle frame is laterally adjustable relative to the main frame such that the cutting swath is extendable outside of the wheel base.

22. A carriage device for a string trimmer comprising:
   an axle frame supporting at least two wheels; and
   a main frame including an axle mounting section for adjustably securing the axle frame relative to the main frame and a shaft receiving section shaped to receive a string trimmer shaft,
   wherein the axle mounting section comprises a plurality of connecting areas for selectively adjusting a height of the main frame relative to ground by adjusting a position of the axle frame on the axle mounting section, and wherein the axle frame is laterally adjustable relative to the main frame.

23. A carriage device according to claim 22, wherein the axle frame comprises at least two swivel wheels secured via respective wheel connectors, the swivel wheels being mounted to swivel about an axis substantially perpendicular to the axle frame.

24. A carnage device according to claim 23, wherein the axle frame comprises a plurality of wheel mounting holes across the axle frame for each of the wheels, and wherein the wheels are selectively securable in any of the wheel mounting holes.

25. A carriage device according to claim 22, wherein the axle frame is bent at ends thereof into at least two L-shaped brackets, and wherein the wheels are rotatably secured to bent portions of the L-shaped brackets.

26. A carriage device according to claim 22, wherein the shaft receiving section comprises a V-shaped groove for receiving the string trimmer shaft.

27. A carriage device according to claim 22, wherein the main frame is substantially triangular-shaped comprising the axle mounting section, the shaft receiving section, and a supporting bracket, wherein the axle mounting section and the supporting bracket are joined at an apex of the triangular shape, and wherein the shaft receiving section is connected between the axle mounting section and the supporting bracket.

28. A carriage device according to claim 27, wherein an angle between the axle mounting section and the supporting bracket is set to a shaft angle of the string trimmer.

29. A carriage device according to claim 22, wherein the main frame is configured such that the shaft receiving section is disposed at an angle matching a shaft angle of the string trimmer.

30. A carriage device according to claim wherein the axle mounting section comprises a Z-frame including a central aperture for receiving a first axle connector that secures the axle frame, and at least one arm member formed in an arc and including indexed apertures along the arc for selectively receiving a second axle connector that secures the axle frame such that the axle frame is rotatably adjustable relative to the main frame.

31. A carriage device according to claim 22, wherein the main frame further comprises a battery bracket adjustably sized to support a battery for the string trimmer.

32. A carriage device according to claim 22, wherein the axle frame supports a first wheel type, and wherein the axle frame is interchangeable with an alternative axle frame supporting a second wheel type.

33. A kit comprising components for constructing the carriage device of claim 22.

34. A flexible line blade rotary mower without a mower deck or discharge chute comprising:
   the carriage device of claim 22; and
   a string trimmer mounted on the carriage device.

* * * * *